(12) United States Patent
Fujimoto et al.

(10) Patent No.: US 11,074,271 B2
(45) Date of Patent: Jul. 27, 2021

(54) DATABASE MANAGEMENT SYSTEM AND DATABASE MANAGEMENT METHOD

(71) Applicants: HITACHI, LTD., Tokyo (JP); The University of Tokyo, Tokyo (JP)

(72) Inventors: Taro Fujimoto, Tokyo (JP); Takuya Isozaki, Tokyo (JP); Akira Shimizu, Tokyo (JP); Kazuo Goda, Tokyo (JP); Yuto Hayamizu, Tokyo (JP); Masaru Kitsuregawa, Tokyo (JP)

(73) Assignees: HITACHI, LTD., Tokyo (JP); THE UNIVERSITY OF TOKYO, Tokyo (JP)

(*) Notice: Subject to any disclaimer, the term of this patent is extended or adjusted under 35 U.S.C. 154(b) by 391 days.

(21) Appl. No.: 16/135,000

(22) Filed: Sep. 19, 2018

(65) Prior Publication Data
US 2019/0163799 A1    May 30, 2019

(30) Foreign Application Priority Data

Nov. 30, 2017 (JP) .............................. JP2017-229890

(51) Int. Cl.
G06F 16/25    (2019.01)
G06F 16/21    (2019.01)
G06F 16/22    (2019.01)
G06F 16/23    (2019.01)

(52) U.S. Cl.
CPC ............ G06F 16/258 (2019.01); G06F 16/21 (2019.01); G06F 16/2282 (2019.01); G06F 16/2393 (2019.01)

(58) Field of Classification Search
CPC .................................................. G06F 16/258

USPC .......................................................... 707/791
See application file for complete search history.

(56) References Cited

U.S. PATENT DOCUMENTS

| | | | | |
|---|---|---|---|---|
| 9,619,535 B1* | 4/2017 | Kapoor | ................ | G06F 16/254 |
| 2008/0307386 A1* | 12/2008 | Chen | ...................... | G06Q 30/02 |
| | | | | 717/109 |
| 2009/0271342 A1* | 10/2009 | Eder | ...................... | G16H 50/50 |
| | | | | 706/20 |
| 2010/0094981 A1* | 4/2010 | Cordray | ................ | H04L 41/082 |
| | | | | 709/222 |

(Continued)

OTHER PUBLICATIONS

Author: Seeger et al Title: Convert row-organized tables to column-organized tables in DB2 10.5 with BLU Acceleration, Publisher: IBM, Pertinent pp. 12 (Year: 2014).*

(Continued)

*Primary Examiner* — Syling Yen
(74) *Attorney, Agent, or Firm* — Mattingly & Malur, PC

(57) ABSTRACT

A database management system (DBMS) performs, in response to a conversion request to convert a store format of a table in a database, a process (base type change process) for changing a store format indicated by information (base type) indicating the store format of the table to a store format according to the conversion request, and performs a data conversion process asynchronously with the aforementioned process. In an import process after the base type change process, the DBMS imports, into the table, a chunk in the store format indicated by the base type after change. In the data conversion process, the DBMS converts a chunk in a store format different from the store format indicated by the base type into a chunk in the store format indicated by the base type.

14 Claims, 17 Drawing Sheets

(56) References Cited

U.S. PATENT DOCUMENTS

| | | | | |
|---|---|---|---|---|
| 2013/0073515 A1* | 3/2013 | Bhide | ............... | G06F 16/254 |
| | | | | 707/602 |
| 2015/0310082 A1* | 10/2015 | Han | ............... | G06F 16/283 |
| | | | | 707/602 |
| 2015/0310129 A1* | 10/2015 | Ushijima | ............ | G06F 16/25 |
| | | | | 707/798 |
| 2018/0315113 A1* | 11/2018 | Shah | ............... | G06Q 30/08 |

OTHER PUBLICATIONS

Jim Seeger, et al., "Convert row-organized tables to column-organized tables in DB2 10.5 with BLU Acceleration", IBM corporation; developerWorks, Jun. 12, 2014.

\* cited by examiner

FIG. 3

A. IMPORT PROCESS

TABLE DEFINITION MANAGEMENT TABLE
129

| U-ID (301) | T-ID (302) | BASE TYPE (303) | STORE STATUS (304) |
|---|---|---|---|
| 01 | T-01 | COLUMN | ROW AND COLUMN |
| 02 | T-02 | ROW | ROW ONLY |
| ... | ... | ... | ... |

CHUNK MANAGEMENT TABLE
130

| C-ID (311) | T-ID (312) | IMPORT TIME (313) | REFERENCE TIME (314) | UPDATE TIME (315) | ACCESS COST (316) | HW (317) |
|---|---|---|---|---|---|---|
| ... | ... | ... | ... | ... | ... | ... |
| 004 | 01 | 2017/01/01 08:00:15 | - | - | 150 | ON |
| ... | ... | ... | ... | ... | ... | ... |

T-ID=01

| C-ID=001 | C-ID=002 | C-ID=003 | C-ID=004 |
|---|---|---|---|
| "ROW" | "ROW" | "ROW" | "COLUMN" |

T-ID=02

| C-ID=001 | C-ID=002 | C-ID=003 | C-ID=004 |
|---|---|---|---|
| "ROW" | "ROW" | "ROW" | "ROW" |

FIG. 4
B. PURGE PROCESS
TABLE DEFINITION MANAGEMENT TABLE
129
| U-ID (301) | T-ID (302) | BASE TYPE (303) | STORE STATUS (304) |
|---|---|---|---|
| 01 | T-01 | COLUMN | ROW AND COLUMN |
| 02 | T-02 | ROW | ROW ONLY |
| ... | ... | ... | ... |
CHUNK MANAGEMENT TABLE
130
| C-ID (311) | T-ID (312) | IMPORT TIME (313) | REFERENCE TIME (314) | UPDATE TIME (315) | ACCESS COST (316) | HW (317) |
|---|---|---|---|---|---|---|
| ~~1~~ | ~~01~~ | ~~2017/01/01 08:00:00~~ | ~~2017/02/02 17:00:00~~ | ~~2017/02/03 09:00:00~~ | ~~100~~ | ~~ON~~ |
| ... | ... | ... | ... | ... | ... | ... |
T-ID=01
C-ID=001 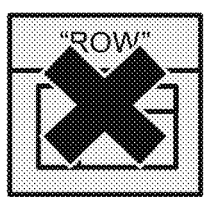
"ROW"
C-ID=002 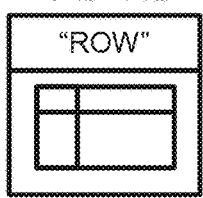
"ROW"
C-ID=003 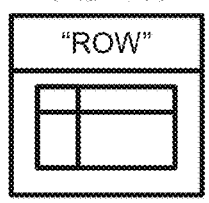
"ROW"
C-ID=004 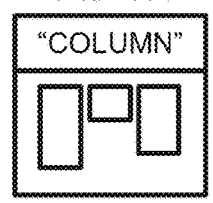
"COLUMN"
T-ID=02
C-ID=001 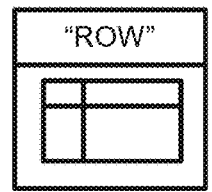
"ROW"
C-ID=002 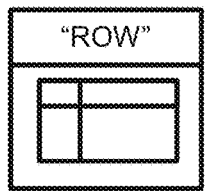
"ROW"
C-ID=003 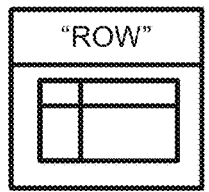
"ROW"
C-ID=004 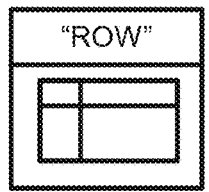
"ROW"

D. DATA CONVERSION PROCESS

TABLE DEFINITION MANAGEMENT TABLE
129

| U-ID (301) | T-ID (302) | BASE TYPE (303) | STORE STATUS (304) |
|---|---|---|---|
| ... | ... | ... | ... |
| 02 | T-02 | COLUMN | ROW and COLUMN |
| ... | ... | ... | ... |

CHUNK MANAGEMENT TABLE
130

| C-ID (311) | T-ID (312) | IMPORT TIME (313) | REFERENCE TIME (314) | UPDATE TIME (315) | ACCESS COST (316) | HW (317) |
|---|---|---|---|---|---|---|
| ... | ... | ... | ... | ... | ... | ... |
| 2 | 02 | 2017/01/01 08:00:10 | 2017/01/01 08:00:10 | 2017/02/03 10:00:00 | 300 | ON |
| ... | ... | ... | ... | ... | ... | ... |

600: `adbchgchunktype -p STORAGE_PERIOD -n 1 T-ID=01`

- PARAMETER A
- PARAMETER B (C-ID=1, 2)
- PARAMETER C

FIG. 8

P1. DATA RETENTION PERIOD

| | C-ID=001 "ROW" | C-ID=002 "ROW" | C-ID=003 "ROW" |
|---|---|---|---|
| IMPORT TIME | 2017/01/01 08:00:00 | 2017/01/01 08:00:05 | 2017/01/01 08:00:10 |
| CONVERSION PRIORITY | LOW | MEDIUM | HIGH |

P2. REFERENCE TIME/REFERENCE FREQUENCY

| | C-ID=001 "ROW" | C-ID=002 "ROW" | C-ID=003 "ROW" |
|---|---|---|---|
| REFERENCE TIME | 2017/02/02 17:00:00 | 2017/01/01 08:00:05 | 2017/01/01 08:00:10 |
| CONVERSION PRIORITY | HIGH | MEDIUM | LOW |

P3. UPDATE TIME/UPDATE FREQUENCY

| | C-ID=001 "ROW" | C-ID=002 "ROW" | C-ID=003 "ROW" |
|---|---|---|---|
| UPDATE TIME | 2017/02/03 09:00:00 | 2017/01/01 08:00:05 | 2017/02/03 10:00:00 |
| CONVERSION PRIORITY | LOW | HIGH | MEDIUM |

FIG. 9

P4. ACCESS COST

| | C-ID=001 "ROW" | C-ID=002 "ROW" | C-ID=003 "ROW" |
|---|---|---|---|
| DATA AMOUNT | SMALL | MEDIUM | LARGE |
| CONVERSION PRIORITY | LOW | MEDIUM | HIGH |

P5. HARDWARE DEVICE OPERATION STATUS

| | C-ID=001 "ROW" | C-ID=002 "ROW" | C-ID=003 "ROW" |
|---|---|---|---|
| HW | OFF | OFF | ON |
| CONVERSION PRIORITY | LOW | LOW | HIGH |

FIG. 16

TABLE DEFINITION MANAGEMENT TABLE 1600

| 301 U-ID | 302 T-ID | 303 BASE TYPE | 304 STORE STATUS | 1611 ARCHIVE TIME PERIOD |
|---|---|---|---|---|
| ... | ... | ... | ... | ... |
| 02 | T-02 | COLUMN | ROW and COLUMN | 6 MONTHS |
| ... | ... | ... | ... | ... |

FIG. 17

CHUNK MANAGEMENT TABLE 1700

| 311 C-ID | 312 T-ID | 313 IMPORT TIME | 314 REFERENCE TIME | 315 UPDATE TIME | 1716 ARCHIVE TIME | 317 ACCESS COST | 318 HW |
|---|---|---|---|---|---|---|---|
| ... | ... | ... | ... | ... | ... | ... | ... |
| 003 | 01 | 2017/01/01 08:00:10 | 2017/01/01 08:00:10 | 2017/02/03 10:00:00 | 2018/03/01 08:00:00 | 300 | ON |
| ... | ... | ... | ... | ... | ... | ... | ... |

FIG. 18

P6. ARCHIVE TIME

| | C-ID=001 "ROW" | C-ID=002 "ROW" | C-ID=003 "ROW" |
|---|---|---|---|
| ARCHIVE TIME | 2017/01/01 09:00:00 | 2018/02/01 08:00:00 | 2018/03/01 08:00:00 |
| CONVERSION PRIORITY | LOW | MEDIUM | HIGH |

DATABASE MANAGEMENT SYSTEM AND DATABASE MANAGEMENT METHOD

CROSS-REFERENCE TO PRIOR APPLICATION

This application relates to and claims the benefit of priority from Japanese Patent Application number 2017-229890, filed on Nov. 30, 2017 the entire disclosure of which is incorporated herein by reference.

BACKGROUND

The present invention is generally related to data processing, and is related, for example, to database management.

In recent years, data amount has been on the increase. For example, a system that uses frequently generated sensor data as big data is known.

When the data amount is increased, consumed storage capacity (for example, the number of storage devices that are installed) or processor utilization rate is expected to increase, and thus, an increase in power consumption is expected with respect to data processing.

There is a demand for a technique to reduce power consumption even in a case where the data amount is increased.

For example, with respect to database management, normally, power consumption can be expected to be reduced by a column store format than by a row store format. This is because the column store format achieves a high compression effect, and an increase in the number of storage devices that are installed or an increase in processor utilization rate can be expected to be reduced.

Accordingly, it is conceivable to perform as appropriate a data conversion process for converting a row store table (table stored in the row store format) in a database into a column store table (table stored in the column store format) (for example, a process disclosed on page 2 of Non-Patent Literature 1).
Non-Patent Literature 1:
Jim Seeger, Tan Jin Xu, and Prashanthini Shivanna, "Convert row-organized tables to column-organized tables in DB2 10.5 with BLU Acceleration", developerWorks, IBM Corporation (https://www.ibm.com/developerworks/library/dm-1406convert-table-db2105/dm-1406convert-table-db2105-pdf.pdf)

SUMMARY

A search process can be performed in response to a search request even during the data conversion process. This is because a row store table which is a conversion source can be used as a search target.

However, an import process for importing (adding) data into a table which is a data conversion target cannot be performed during the data conversion process. This is to maintain consistency of the database.

In the case of data which is frequently generated (for example, every minute), such as sensor data, the import process is desirably performed at a high frequency (such as every several minutes). However, a table generally has a large size, and the data conversion process takes a long time (for example, several to several tens of hours). Accordingly, the data conversion process for reducing power consumption cannot be performed while performing the import process at a high frequency.

To avoid such a problem, it is conceivable to store all the tables in the column store format from the start.

However, storing a table in the column store format does not always contribute to reducing power consumption. For example, a processing cost is sometimes lower for the row store table than for the column store table. Furthermore, there are several row store formats, and the row store format with a low processing cost may be different depending on the table. Due to such reasons, even if all the tables are stored in the column store format from the start, the data conversion process for converting a column store table into a row store table, and the data conversion process for converting a column store table (table stored in a certain column store format) into another column store table (table stored in another column store format) may become necessary.

In this manner, even if all the tables are stored in the column store format from the start, the data conversion process possibly has to be performed. Accordingly, a situation where the data conversion process for reducing power consumption cannot be performed while performing the import process at a high frequency is not always avoidable. If the data conversion process is to be performed, the import process has to be stopped. If the import process is stopped for a long time period (a long time interval), the target of a process which is performed in response to a request, such as a search request, is an old table which is not subjected to the import process for a long time period (for example, a table to which new data is not added), and as a result, a latest response cannot be returned for the request.

A similar problem may arise for data other than a table, and data processing other than database management.

A database management system (hereinafter "DBMS") performs a base type change process in response to a conversion request, which is a request to convert the store format of a table in a database, the base type change process being a process for changing the store format indicated by a base type, which is information indicating a store format of a table, into a store format according to the conversion request. The DBMS performs the actual data conversion process asynchronously with the base type change process.

The DBMS regularly (or irregularly) performs the import process, which is a process for importing a chunk in a store format indicated by the base type into a table. In the import process after the base type change process, the DBMS imports a chunk in a store format indicated by the base type after change into the table. Accordingly, at this time point, a chunk in a store format indicated by the base type before change (for example, the row store format) and a chunk in a store format indicated by the base type after change (for example, the column store format) are present in a mixed manner in the table.

In the data conversion process, the DBMS converts a non-converted chunk, which is a chunk in a different store format from a store format indicated by the base type, among all the chunks in the table, into a chunk in the store format indicated by the base type.

The data conversion process for reducing power consumption can be performed while performing the import process at a high frequency.

BRIEF DESCRIPTION OF THE DRAWINGS

FIG. 3 shows an example outline of an import process;
FIG. 4 shows an example outline of a purge process;

FIG. 8 shows several relationships between an example of a priority point, and conversion priority for a data conversion process for converting a row store format into a column store format;

FIG. 9 shows the rest of the relationships;

FIG. 16 shows a structure of a table definition management table according to the second embodiment;

FIG. 17 shows a structure of a chunk management table according to the second embodiment;

FIG. 18 shows a relationship between a priority point "archive time", and conversion priority for a data conversion process for converting a row store format into a column store format;

DESCRIPTION OF EMBODIMENTS

Figure 1:
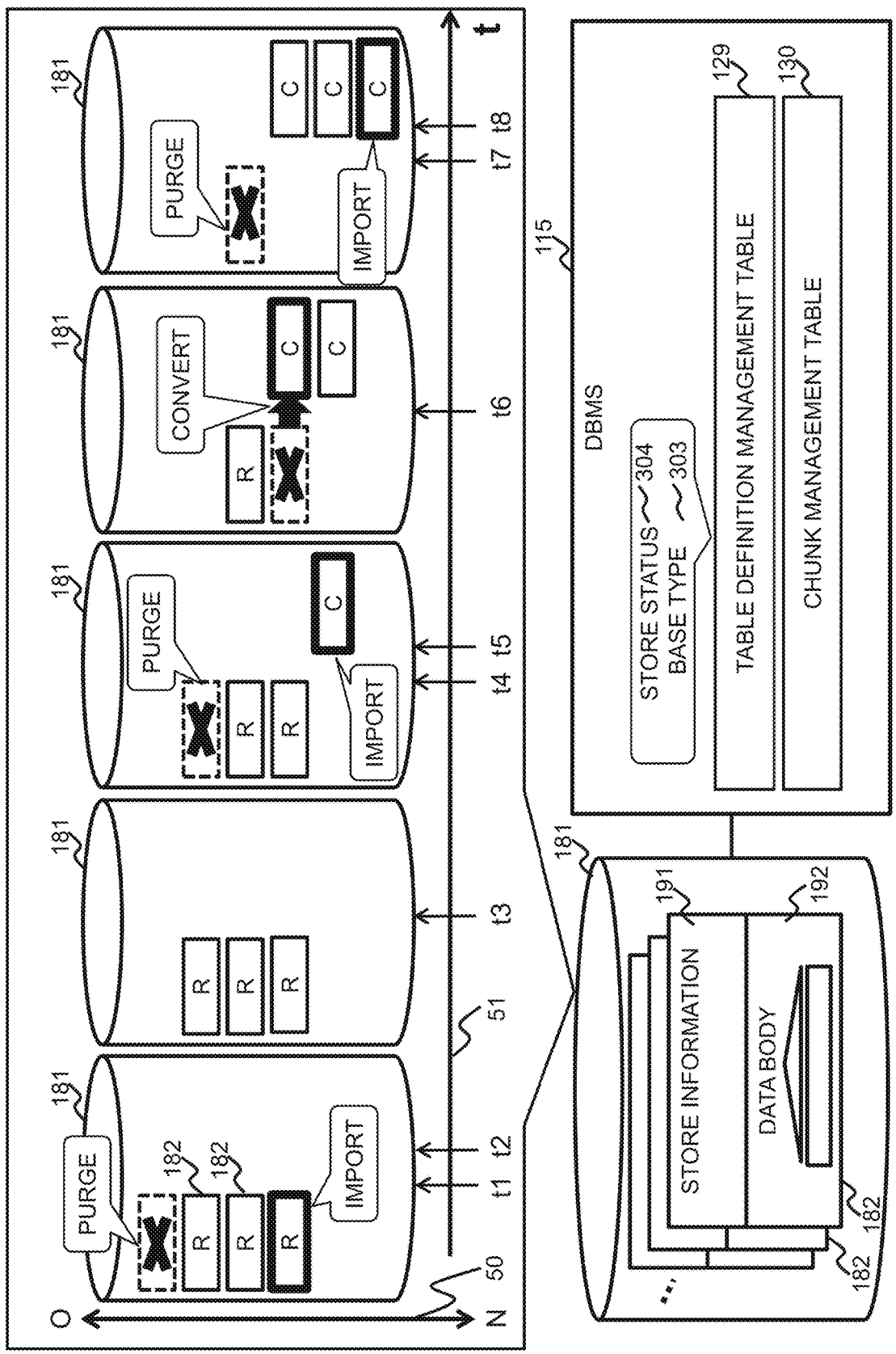
FIG. 1 shows an outline of a first embodiment.

In the following description, a database may be referred to as "DB", and a database management system as "DBMS". A DB server is a server for executing the DBMS, for example. A source of issuance of a query for the DBMS may be a computer program (for example, an application program) outside the DBMS. An external computer program may be a program which is executed in the DB server, or may be a program which is executed by a device connected to the DB server (for example, a client computer).

In the following description, in a case of not distinguishing between elements of a same type, a reference sign (or a common number in reference signs) may be used, and in a case of distinguishing between elements of a same type, an ID assigned to each element (or a reference sign for each element) may be used.

In the following description, "interface section" is one or more interfaces. One or more interfaces may be one or more interface devices of a same type (for example, one or more network interface cards (NICs)), or may be two or more interface devices of different types (for example, an NIC and a host bus adapter (HBA)).

In the following description, "memory section" is one or more memories. At least one memory may be a volatile memory or a non-volatile memory.

In the following description, "processor section" is one or more processors. Typically, at least one processor is a central processing unit (CPU). A processor may include a hardware circuit for performing at least one or all of processes.

In the following description, "PDEV" refers to a physical storage device, and is typically a non-volatile storage device (for example, an auxiliary storage device) such as a hard disk drive (HDD) or a solid state drive (SSD).

In the following description, a function is sometimes described using a term "kkk section", but a function may be realized by execution of one or more computer programs by the processor section, or may be realized by one or more hardware circuits (for example, an FPGA or an application specific integrated circuit (ASIC)). In the case where a function is realized by execution of a program by the processor section, a predetermined process is performed using the memory section and/or the interface section as appropriate, and thus, the function may be assumed to be at least a part of the processor section. A process described with a function as a subject may be a process that is performed by the processor section or by a device provided with the processor section. A program may be installed from a program source. For example, a program source may be a program distribution computer or a recording medium that can be read by a computer (for example, a non-transitory recording medium). Description of each function is merely exemplary, and a plurality of functions may be achieved by one function, or one function may be divided into a plurality of functions.

In the following description, management information may be described using a term "xxx management table", but management information may be expressed by any data structure. That is, to indicate that management information is not dependent on the data structure, "xxx management table" may be referred to as "xxx management information". In the following description, the structure of each management table is only an example. With respect to at least one management table, not all the information items (for example, columns or rows) have to be necessary, and more information items may be included or at least one information item may be removed. One management table may be divided into two or more management tables, and all or some of at least two management tables may be realized by one management table.

In the following description, "computer system" may be at least one of a server system and a storage system. The "server system" may be one or more physical servers (for example, a cluster of servers), or may include at least one virtual server (for example, virtual machine (VM)). The "storage system" may be one or more physical storage devices, or may include at least one virtual storage device (for example, software defined storage (SDS)).

In the following, several embodiments will be described with reference to the drawings. Additionally, the present invention is not limited to the following description.

First Embodiment

FIG. 1 shows an outline of a first embodiment.

When a conversion request to convert a store format of a table 181 is received, a DBMS 115 performs, in response to the conversion request, a base type change process for changing the store format indicated by a base type (information indicating a store format of a table) 303 to a store format according to the conversion request. However, the DBMS 115 does not perform a data conversion process. The DBMS 115 is to perform the data conversion process asynchronously with the base type change process. Additionally, the base type 303 is stored in a table definition management table 129 holding information about definition of each table. The table definition management table 129 is managed by the DBMS 115. The table definition management table 129 also holds a store status 304, described later, for each table.

The DBMS 115 regularly (or irregularly) performs an import process for importing data into the table 181. In the following, an import unit of data will be referred to as "chunk". The import process cannot be performed during the data conversion process. In the import process, the DBMS 115 imports a chunk 182 in a store format indicated by the base type 303. Accordingly, in the import process after the base type change process, the chunk 182 is imported in a store format indicated by the base type after change. As a result, the store status indicated by the information "store status 304" in the table 181 is a mixture of a chunk 182 in a store format indicated by the base type before change and a chunk 182 in a store format indicated by the base type after change.

After the base type change process, a chunk in the store format indicated by the base type before change is taken as a non-converted chunk. The DBMS 115 performs the data conversion process on X conversion target chunks among all the non-converted chunks. The "X conversion target chunks" are chunks which are selected as targets of the data conversion process, from all the non-converted chunks. The X is a natural number. This data conversion process is completed in a shorter time than a data conversion process performed on a per-table basis. Accordingly, the data conversion process for reducing power consumption can be performed while performing the import process at a high frequency (without waiting for start of the import process, for example).

In the following, an outline of a process performed by the DBMS 115 at each time t1, . . . , t8 will be described.

Additionally, in FIG. 1, an arrow 50 indicates newness of a chunk in the table 181, or in other words, recency of import time. The closer the import time is to a time direction side, the newer the import time (indicated by "N" in FIG. 1), and the closer the import time is to a side opposite the time direction, the older the import time (indicated by "O" in FIG. 1).

In FIG. 1, an arrow 51 corresponds to lapse of time (t). A direction of the arrow 51 indicates a time direction (direction of elapsed time). Furthermore, in FIG. 1, a position of the table 181 along the time direction indicates transition of the table 181 according to lapse of time.

In the present embodiment, the chunk 182 is configured of a header 191 and a data body 192, and the header 191 includes store information. The store information indicates the store format of the chunk 182 including the store information. The data structure of the data body 192 is a data structure in the store format indicated by the base type 303.

In FIG. 1, "R" in the chunk 182 refers to a chunk in a row store format, and "C" refers to a chunk in a column store format.

<Process at Time t1>

A process at the time t1 is the import process. Before the time t1, the base type 303 before change indicates "ROW" (row store format). Accordingly, in the import process at the time t1, the DBMS 115 imports a chunk R (chunk in the row store format) into the table 181. The DBMS 115 sets, in the header 191 of the imported chunk R, store information indicating the store format "ROW" of the chunk R. Additionally, before the time t1, the store status 304 of the table 181 is "ROW only" (chunks in the table 181 are all chunks R), and as shown in the drawing, also after execution of the import process at the time t1, the chunks in the table 181 are all chunks R. Accordingly, the store status 304 is not update in the import process.

<Process at Time t2>

A process at the time t2 is a purge process. The purge process is an example of an exclusion process for excluding a chunk 182 from the table 181, and is a process for purging (deleting) a purge target chunk 182 from the table 181. An example of the "purge target chunk" is a chunk for which a specific period of time (data retention period) has passed from the import time of the chunk (in other words, a chunk with old import time). In this manner, a chunk 182 is purged from the table 181 as appropriate, and a consumed storage capacity can be reduced, and reduction in power consumption can be expected.

In the purge process at the time t2, the DBMS 115 purges a chunk R for which the specific period of time (data retention period) has passed from the import time.

Additionally, also in the purge process, the DBMS 115 updates the store status 304 of the table 181 as necessary. However, after execution of the purge process at the time t2, the chunks in the table 181 are still all chunks R, and thus, the store status 304 is not updated in the purge process.

<Process at Time t3>

A process at the time t3 is the base type change process. In the base type change process, the base type 303 is changed from "ROW" to "COLUMN".

<Process at Time t4>

A process at the time t4 is the import process. At the time t4, the base type 303 indicates "COLUMN". Accordingly, the DBMS 115 imports a chunk C (chunk in the column store format) into the table 181. The DBMS 115 sets, in the header 191 of the imported chunk C, store information indicating the store format "COLUMN" of the chunk 182. At this time point, the chunks R and the chunk C are present in a mixed manner in the table 181, and thus, the DBMS 115 updates the store status 304 of the table 181 from "ROW only" to "ROW and COLUMN" (chunk(s) R and chunk(s) C are present in a mixed manner in the table 181).

<Process at Time t5>

A process at the time t5 is the purge process. In the purge process, the DBMS 115 purges a chunk R for which the specific period of time has passed from the import time.

<Process at Time t6>

A process at the time t6 is the data conversion process. In the data conversion process, a chunk R in a store format different from the store format indicated by the base type 303 after change, i.e., "COLUMN", is the non-converted chunk. The DBMS 115 changes the non-converted chunk R into a chunk C. Specifically, the DBMS 115 converts a data body R (a data body having a data structure according to the row store format) in the chunk R into a data body C (a data body having a data structure according to the column store format) while keeping the data body R as it is, and then, deletes the data body R. During the data conversion process, the data body R, which is a conversion source, is the target of a search process.

Additionally, as shown in FIG. 1, a plurality of non-converted chunks R are in the table 181 at the time t6, and which of the non-converted chunks is to be preferentially taken as a conversion target chunk is determined based on conversion priority according to one or more priority points, as described later. In the example in FIG. 1, conversion priority is the highest for a non-converted chunk R for which a priority point "data retention period" is the shortest (latest import time).

<Process at Time t7>

A process at the time t7 is the import process. This import process is the same as the import process at the time t4. Also after this import process, the chunk R and the chunks C are present in a mixed manner in the table 181, and update of the store status 304 "ROW and COLUMN" is not necessary.

<Process at Time t8>

A process at the time t8 is the purge process. In the purge process, the DBMS 115 purges a chunk R for which the specific period of time has passed from the import time. As a result, all the chunks in the table 181 are chunks C, and the DBMS 115 updates the store status 304 of the table 181 from "ROW and COLUMN" to "COLUMN only" (chunks in the table 181 are all chunks "C").

According to the description given above, the data conversion process of the present embodiment is completed in a shorter time than a data conversion process performed on a per-table basis, and thus, the data conversion process for reducing power consumption can be realized without stopping the import process, in addition to the search process. Accordingly, a need to perform timely determination by analyzing latest data at any time can be met, while reducing an increase in power consumption caused by an increase in data amount.

Additionally, in the present embodiment, the import process and the purge process are performed regularly, and the base type change process and the data conversion process (and the search process) are performed irregularly. Alternatively, at least one of the import process and the purge process may be performed irregularly, or at least one of the base type change process and the data conversion process (and the search process) may be performed regularly.

The present embodiment will be described below in detail.

Figure 2:
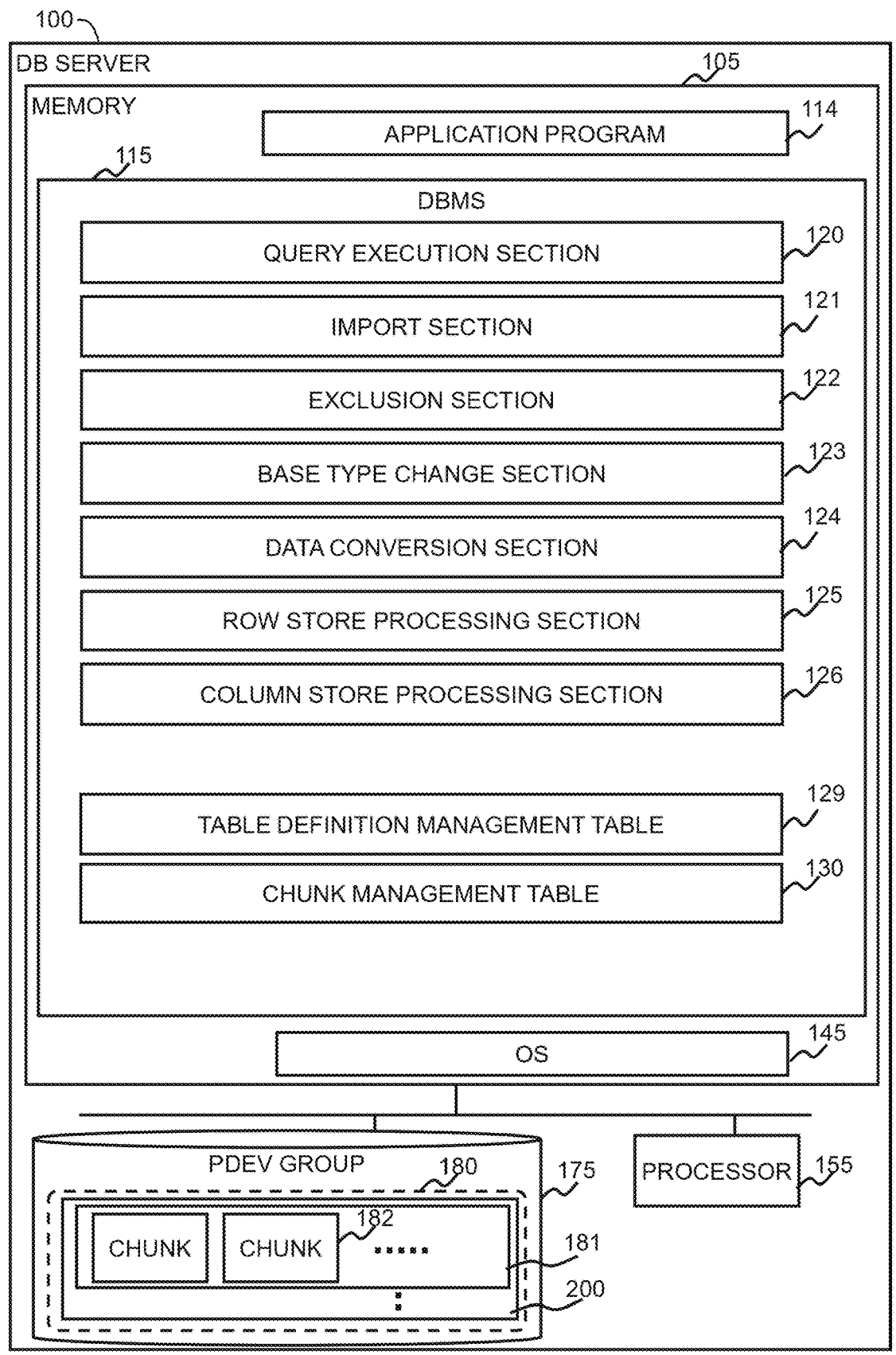
FIG. 2 shows a structure of a DB server according to the first embodiment.

FIG. 2 shows a structure of the DB server according to the first embodiment.

A DB server 100 is an example of a computer system. For example, the DB server 100 may be a personal computer, a workstation, or a mainframe, or may be a virtual computer configured of a virtualization program at such a computer. The DB server 100 includes a PDEV group 175, a memory 105, and a processor 155 connected to the PDEV group 175 and the memory 105. The DB server 100 may include an input device such as a keyboard or a pointing device (not shown), and an output device such as a liquid crystal display (not shown). The input device and the output device may be connected to the processor 155. The input device and the output device may be integrated with each other.

The PDEV group 175 is one or more PDEVs. A storage area (hereinafter "DB area") 180 based on a storage space in the PDEV group 175 is provided in the DBMS 115. A DB 200, which is managed by the DBMS 115, is stored in the DB area 180. The DB 200 includes one or more tables (typically, a plurality of tables) 181. The DB 200 may further include one or more indexes (typically, a plurality of indices). In the present embodiment, the table 181 includes one or more chunks 182. Each chunk 182 is an import unit, and is a collection of one or more records. The one or more records are configured of one or more columns. An index is a data structure created with one or more columns or the like in the table 181 as a target, and is for speeding up access to the table 181 using a selection condition including the column or the like as the target of the index. Additionally, the DB area 180 is a collection of one or more logical areas. Each logical area is a storage area (for example, an LDEV, which is a logical storage device) based on one or more PDEVs. In the present embodiment, a state of each PDEV is roughly divided into an activation state (an example of a non-power-saving state) and a power-saving state. The "activation state" includes a state where the PDEV is being activated, and a state where activation of the PDEV is completed and I/O is enabled. The "power-saving state" is a state of low power consumption where I/O to the PDEV is not possible (for example, power-off state, sleep state, or standby state). Each PDEV transitions from the power-saving state to the activation state by receiving an activation request or an I/O request. Each PDEV transitions from the activation state to the power-saving state by receiving a power-save transition request (or by not receiving a request for a specific period of time).

The DB server 100 may include a network interface (an example of the interface section) connected to the processor 155, and the PDEV group 175 may be included in an external storage device connected to the network interface.

The memory 105 is an example of the memory section. For example, the memory 105 is a volatile dynamic random-access memory (DRAM) or the like, and temporarily stores programs to be executed by the processor 155 and data to be used by the programs. As the programs, there are the DBMS 115, an operating system (OS) 145, and an application program 114, for example. With the DB server 100, the application program 114 issues a query. The DBMS 115 receives the query from the application program 114, and executes the query. In executing the query, the DBMS 115 issues an input/output (I/O) request to the OS 145 so as to read data from the DB 200 or to write data in the DB 200. The OS 145 receives the I/O request, executes I/O of data with respect to the PDEV group 175 in response to the I/O request, and returns an execution result to the DBMS 115.

The DBMS 115 includes a query execution section 120, an import section 121, an exclusion section 122, a base type change section 123, a data conversion section 124, a row store processing section 125, and a column store processing section 126. The DBMS 115 also includes management tables, such as the table definition management table 129 and a chunk management table 130. Additionally, the structure of the DBMS 115 is only an example. For example, a structural element may be divided into a plurality of structural elements, or a plurality of structural elements may be integrated into one structural element.

The query execution section 120 includes a function of a search section for performing the search process. The query execution section 120 receives a query issued by the application program 114. The query is a query to the DB, and is written in structured query language (SQL) or the like. The query execution section 120 generates, from the received query, an execution plan including at one or more DB operations (DB operators) necessary to execute the query. The execution plan is information including one or more DB operations, and a relationship regarding execution order of the DB operation, for example. The execution plan may be represented by a tree structure using the DB operation as a node, and the relationship regarding execution order of the DB operation as an edge. The query execution section 120 executes the received query according to the generated execution plan, and returns the execution result to the application program 114. In the query execution, the query execution section 120 may (a) generate a task for executing the DB operation, (b) execute the generated task to thereby issue a read request for data necessary for the DB operation corresponding to the task, (c) in a case where another DB operation has to be executed based on the execution result of the DB operation corresponding to the task executed in (b), newly generate one or more tasks for executing the other DB operation, and (d) perform (b) and (c) for each of the tasks newly generated. The query execution section 120 may execute in parallel the one or more tasks generated in the above manner. In the case where there are two or more executable tasks, the query execution section 120 may execute in parallel at least two of the two or more tasks. Additionally, in the above case, the query execution section 120 may execute a plurality of DB operations by one task. The query execution section 120 may also execute a next DB operation using the same task, without newly generating a task each time. With respect to implementation of a task, a user thread realized by a library or the like may also be used, in addition to a process, a kernel thread or the like realized by the OS 145, for example.

The import section 121 regularly performs the import process. The exclusion section 122 regularly performs the purge process (an example of the exclusion process). The base type change section 123 performs the base type change process. The data conversion section 124 performs the data conversion process. The row store processing section 125 refers to or updates a chunk "R" (chunk in the row store format). The column store processing section 126 refers to or updates a chunk "C" (chunk in the column store format).

The table definition management table 129 holds information about definition of each table. Specifically, for example, the table definition management table 129 includes entries for each table, as shown in FIG. 3 (and FIGS. 4 to 6). Each entry stores information such as a U-ID 301, a T-ID 302, the base type 303, and the store status 304.

The U-ID 301 indicates an identifier (ID) of a user of the table 181. The T-ID 302 indicates an ID of the table 181.

The base type 303 indicates the store format of the table 181. "ROW" refers to the row store format. "COLUMN" refers to the column store format.

The store status 304 indicates the store status of chunks in the table 181. "ROW only" means that chunks in the table 181 are all chunks "R". "COLUMN only" means that chunks in the table 181 are all chunks "C". "ROW and COLUMN" means that chunks "R" and chunks "C" are present in a mixed manner in the table 181.

The chunk management table 130 holds information about each chunk. Specifically, for example, the chunk management table 130 includes an entry for each chunk, as shown in FIG. 3 (and FIGS. 4 to 6). Each entry stores information such as a C-ID 311, a T-ID 312, an import time 313, a reference time 314, an update time 315, an access cost 316, and HW 317.

The C-ID 311 indicates an ID of the chunk 182. The T-ID 312 indicates an ID of the table 181 including the chunk 182.

The import time 313 is an import time which is a time when the chunk 182 was imported. In the present embodiment, the time is expressed in year, month, day, time, minute, and second, but units of time may be rougher or finer, or a different unit may be used.

The reference time 314 indicates a reference time which is a time when the chunk 182 was last referred to. The reference time 314 may include, instead of or in addition to the reference time, information about a reference frequency of the chunk 182.

The update time 315 indicates an update time which is a time when the chunk 182 was last updated. The update time 315 may include, instead of or in addition to the update time, information about an update frequency of the chunk 182.

The access cost 316 is a value that is based on a data amount of the chunk 182. The larger the data amount of the chunk 182, the higher the access cost 316.

The HW 317 indicates an operation status of a hardware device where the chunk 182 is stored. In the present embodiment, the "hardware device" is the PDEV, but a unit which is larger or smaller than the PDEV may alternatively be used. With respect to the "operation status", "ON" refers to the activation state (an example of a non-power-saving state), and "OFF" refers to the power-saving state.

At least one piece of information managed by the chunk management table 130 may be stored in the header 191 of the chunk 182, instead of or in addition to being stored in the chunk management table 130. At least one piece of information stored in the header 191 of the chunk 182 (for example, the store information) may be stored in the chunk management table 130, instead of or in addition to being stored in the header 191.

In the following, outlines of examples of the import process, the purge process, the base type change process, and the data conversion process will be described with reference to FIGS. 3 to 7.

<A. Import Process>

FIG. 3 shows an example outline of the import process.

For example, the import process on a table 01 (table with T-ID=01) is as follows.

The base type 303 of the table 01 is "COLUMN", and thus, the import section 121 imports a chunk 004 in the column store format (i.e., chunk with C-ID=004) into the table 01. At this time, the import section 121 sets store information "COLUMN" in the header 191 of the chunk 004. The import section 121 also adds an entry (the import time 313, etc.) corresponding to the chunk 004 in the chunk management table 130. Furthermore, because chunks "R" and a chunk "C" become present in a mixed manner in the table 01 due to the import process, the import section 121 updates the store status 304 of the table 01 from "ROW only" to "ROW and COLUMN".

The import section 121 executes the import process in response to an import request. The import request may be regularly received from outside (for example, the application program 114), or may be regularly issued by the import section 121 as an internal request. A predetermined type of information, such as the T-ID of a target table of the import process, is associated with the import request.

<B. Purge Process>

FIG. 4 shows an example outline of the purge process.

For example, the purge process on the table 01 is as follows.

That is, because the data retention period (elapsed time from the import time) of a chunk 001 in the table 01 exceeds a specific period of time, the exclusion section 122 purges the chunk 001 from the table 01. The exclusion section 122 also deletes an entry corresponding to the chunk 001 from the chunk management table 130.

The exclusion section 122 executes the purge process in response to a purge request. The purge request may be regularly received from outside (for example, the application program 114), or may be regularly issued by the exclusion section 122 as an internal request. A predetermined type of information, such as the C-ID of the purge target chunk and the T-ID of the table including the chunk, is associated with the purge request.

<C. Base Type Change Process>

Figure 5:
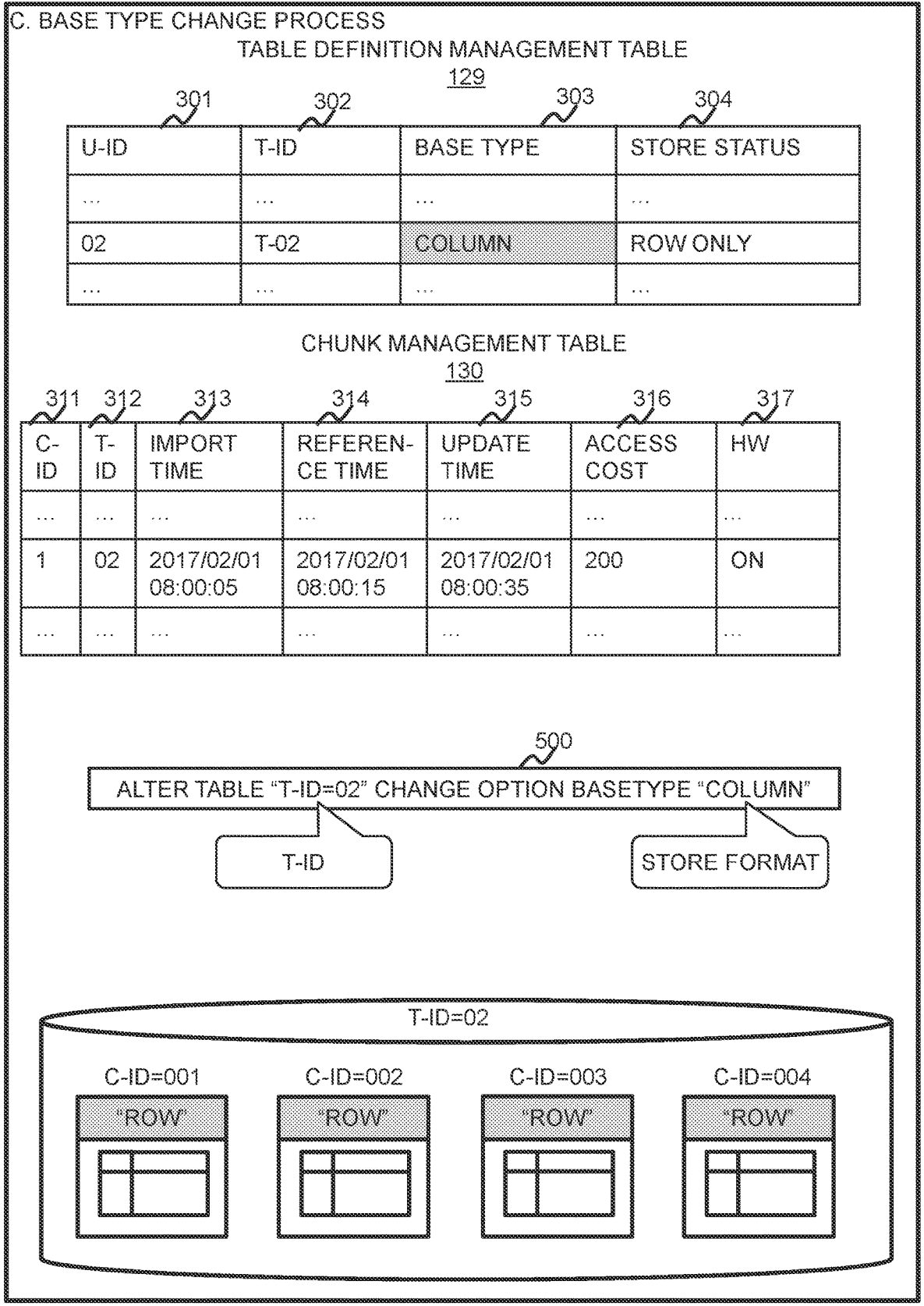
FIG. 5 shows an example outline of a base type change process.

FIG. 5 shows an example outline of the base type change process.

For example, the base type change process on a table 02 is as follows.

That is, in response to a conversion request (for example, ALTER TABLE statement) 500 for the store format of the table 02, the base type change section 123 changes the base type 303 of the table 02 to a store format "COLUMN" according to the conversion request 500. The conversion request 500 specifies the T-ID ("02") of the conversion target table and the store format after change ("COLUMN").

Even when the base type 303 of the table 02 is made "COLUMN", the store formats of chunks 001, . . . , 004 in the table 02 remain "ROW". The store formats of these chunks are converted in the following data conversion process.

<D. Data Conversion Process>

Figure 6:
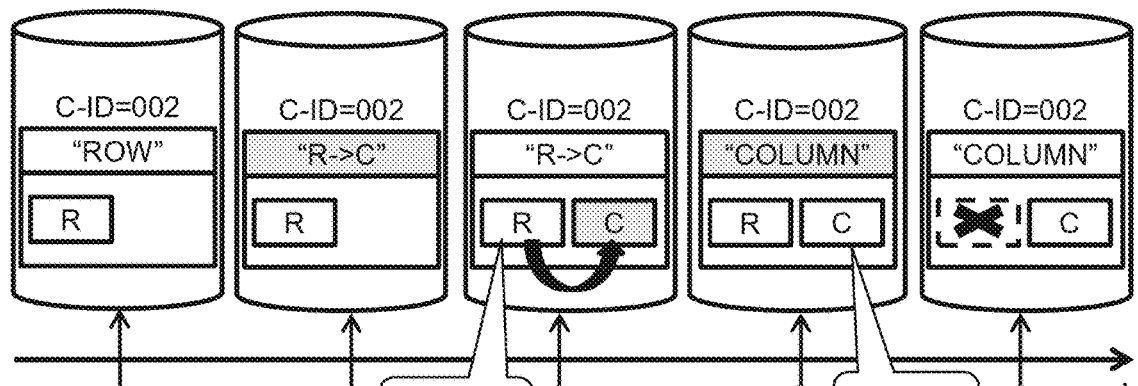
FIG. 6 shows an example outline of a data conversion process.

FIG. 6 shows an example outline of the data conversion process.

The chunk 002 is selected with respect to X conversion target chunks (in this case, X=1) from all the non-converted chunks in the table 02. The chunk 002 is a chunk in the row store format, and thus, the store information is "ROW" (time t00). The data conversion process on the chunk 002 is as follows, for example.

That is, the data conversion section 124 updates the store information of the chunk 002 from "ROW" to "R→C" (value indicating that the row store format is being converted into the column store format) (time t01). The data conversion section 124 reads the data body R (a data body having a data structure according to the row store format) in the chunk 002, converts the data body R into a data body C (a data body having a data structure according to the column store format), and stores the data body C in the same chunk 002 (time t02). If, during this time, the chunk 002 is made a target of the search process, the data body R, which is the conversion source, is taken as the target of the search process. The data conversion section 124 updates the store information in the chunk 002 from "R→C" to "COLUMN" (time t03). The data conversion section 124 updates the store status 304 of the table 02 from "ROW only" to "ROW and COLUMN", and deletes the data body R, which is the conversion source, from the chunk 002 (time t04).

The reason why the chunk 002 is selected is that, of the non-converted chunks in the table 02, the conversion priority, which is according to one or more priority points described later, is the highest for the chunk 002 (or that the C-ID of the chunk 002 is specified by a second conversion request described later).

The data conversion section 124 may automatically perform the data conversion process after a lapse of a specific period of time from the base type change process, but in the present embodiment, the data conversion process may be performed in response to a second conversion request 600 different from the first conversion request 500, which is the conversion request described above, when the second conversion request 600 is received after the base type change process. An execution frequency of the data conversion process may thereby be controlled by a request source (for example, a user (specifically, a client computer of the DB server 100, for example)).

In the second conversion request 600, the following parameters may be specified:
(Parameter A) one or more priority points adopted from one or a plurality of priority points;
(Parameter B) the value of X mentioned above;
(Parameter C) arbitrary number of C-IDs (list of C-IDs of conversion target chunks); and
(Parameter D) the T-ID of the target table of the data conversion process.

That is, the priority point adopted for each data conversion process may be used as the point for the data conversion process.

In the case where Parameter B is specified, data conversion is performed on X conversion target chunks with relatively high conversion priority which is according to Parameter A (one or more priority points), in descending order of conversion priority. Accordingly, data conversion can be expected to be performed on chunks, which are convenient for the request source, in an order convenient for the request source.

In the case where Parameter C is specified, data conversion is performed on conversion target chunks, in descending order of conversion priority which is according to Parameter A (one or more priority points). Accordingly, data conversion can be expected to be performed on chunks desired by the request source in an order convenient for the request source.

Figure 7:
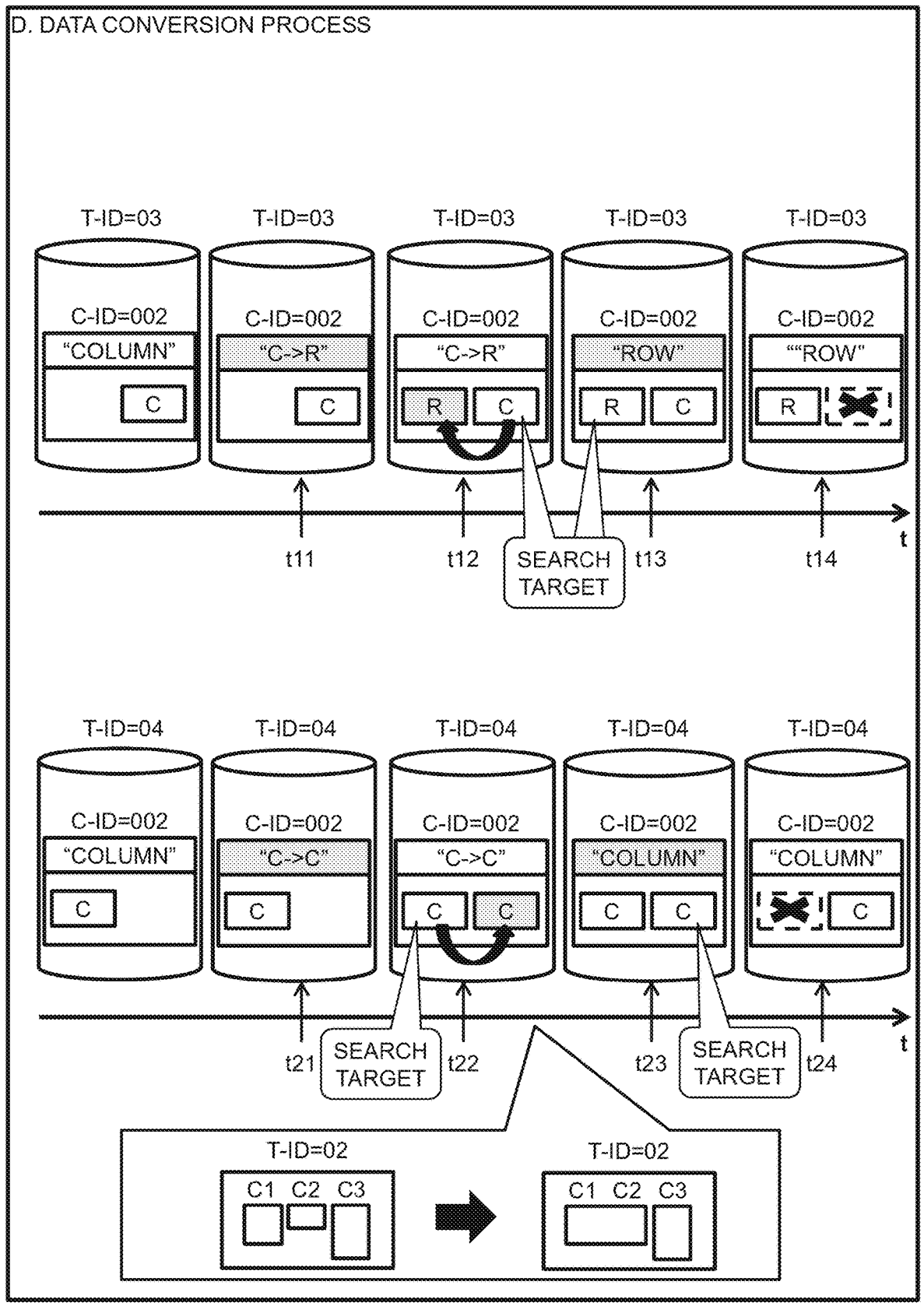
FIG. 7 shows other examples of the data conversion process.

FIG. 7 shows several other examples of the data conversion process.

As the data conversion process, there are processes other than the process for converting the row store format into the column store format, such as a process for converting the column store format into the row store format, and a process for converting a certain column store format into another column store format.

An example of the process for converting the column store format into the row store format is as follows. That is, the data conversion section 124 updates the store information of the chunk 002 in a table 03 from "COLUMN" to "C→R" (value indicating that the column store format is being converted into the row store format) (time t11). The data conversion section 124 reads the data body C in the chunk 002, converts the data body C into a data body R, and stores the data body R in the same chunk 002 (time t12). The data conversion section 124 updates the store information in the chunk 002 from "C→R" to "ROW" (time t13). The data conversion section 124 updates the store status 304 of the table 03 from "COLUMN only" to "ROW and COLUMN", and deletes the data body which is the conversion source from the chunk 002 (time t14).

An example of the process for converting a certain column store format into another column store format is as follows. That is, the data conversion section 124 updates the store information of the chunk 002 in a table 04 from "COLUMN" to "C→C" (value indicating that a column store format is being converted into another column store format) (time t21). The data conversion section 124 reads the data body C in the chunk 002, converts the data body C into another data body C (a data body having a data structure according to the other column store format), and stores the other data body C in the same chunk 002 (time t22). The data conversion section 124 updates the store information in the chunk 002 from "C→C" to "COLUMN" (time t23). The data conversion section 124 maintains the store status 304 of the table 04, and deletes the data body C which is the conversion source from the chunk 002 (time t24).

The process for converting the column store format into the row store format is performed when the row store format is superior in terms of processing cost, for example. The process for converting a certain column store format into another column store format is performed to change a combination regarding column separation for column store, for example. Specifically, for example, the process is performed when a column 1 (C1) and a column 2 (C2) are frequently simultaneously accessed, to convert a store format according to which the column 1 (C1) and the column 2 (C2) are stored separately into a store format according to which the column 1 (C1) and the column 2 (C2) are stored in one column.

FIGS. 8 and 9 show relationships between an example of priority points (P1), . . . , (P5), and conversion priority for the data conversion process for converting the row store format into the column store format.

<(P1) Data Retention Period>

The data retention period of each chunk is the elapsed time from the import time of the chunk.

According to this priority point, the shorter the data retention period (that is, the newer the import time), the higher the conversion priority. This is because the shorter the data retention period, the longer the period until the chunk is purged from the table (the chunk exists longer), and it is considered that it is worth performing the data conversion process especially on such a chunk. In other words, the longer the data retention, the shorter the period until the chunk is purged from the table, and it is considered that it is not worth performing the data conversion process on such a chunk.

<(P2) Reference Time/Reference Frequency>

The reference time of each chunk is the time when the chunk was last referred to, and the reference frequency is the frequency of reference to the chunk.

According to this priority point, the newer the reference time, or the higher the reference frequency, the higher the conversion priority. This is because, generally, the chunk C can be referred to at a higher speed than the chunk R.

<(P3) Update Time/Update Frequency>

The update time of each chunk is the time when the chunk was last updated, and the update frequency is the frequency of update of the chunk.

According to this priority point, the older the update time, or the lower the update frequency, the higher the conversion priority. This is because, generally, the chunk C is updated at a lower speed than the chunk R.

<(P4) Access Cost>

The access cost of each chunk is a value that is based on the data amount of the chunk. The larger the data amount of the chunk, the higher the access cost.

According to this priority point, the higher the access cost, the higher the conversion priority. This is because the larger the data amount of a chunk, the more effective it is to convert a chunk R into a chunk C, which generally achieves a higher compression effect than the chunk R.

<(P5) Operation State of Hardware Device>

An operation state of the hardware device for each chunk is whether the hardware device (for example, the PDEV) storing the chunk is in the activation state (ON) or in the power-saving state (OFF).

For example, the DBMS 115 may reduce the power consumption of the hardware device by using a technique as disclosed in Japanese Patent No. 4908260. For example, the DBMS 115 may place a hardware device storing data which is not accessed in the power-saving state, and place a hardware device storing data to which access is to be performed in the activation state. For this purpose, the DBMS 115 manages the operation state of a hardware device, and a hardware device in the activation state (ON) and a hardware device in the power-saving state (OFF) are possibly present in a mixed manner in the DB server 100.

According to this priority point, the conversion priority is high for a chunk which is stored in a hardware device which is in the activation state (ON). This is because the hardware device is already in the activation state and does not have to be placed in the activation state for the data conversion process, and thus, reduced power consumption can be maintained.

A non-converted chunk for which the conversion priority determined according to one or more priority points among the priority points (P1), . . . , (P6) is relatively high is preferentially made a conversion target chunk. Additionally, the data conversion section 124 does not select, as the conversion target chunk, a non-converted chunk for which the conversion priority is lower than predetermined priority (i.e., the data conversion process is skipped).

FIGS. 8 and 9 show relationships between an example of the priority points (P1), . . . , (P5), and conversion priority for the data conversion process for converting the row store format into the column store format. Relationships between an example of the priority points (P1), . . . , (P5), and conversion priority for the data conversion process for converting the column store format into the row store format is as follows. That is, (P1), (P4) and (P5) are as shown in FIGS. 8 and 9. The reverse is true for (P2) and (P3). That is, with respect to the priority point "reference time/reference frequency", the older the reference time, or the lower the reference frequency, the higher the conversion priority. This is because, generally, the chunk R is referred to at a lower speed than the chunk C. On the other hand, with respect to the priority point "update time/update frequency", the newer the update time, or the higher the update frequency, the higher the conversion priority. This is because, generally, the chunk R is updated at a higher speed than the chunk C.

In the following, an example flow of a process performed in the present embodiment will be described.

Figure 10:
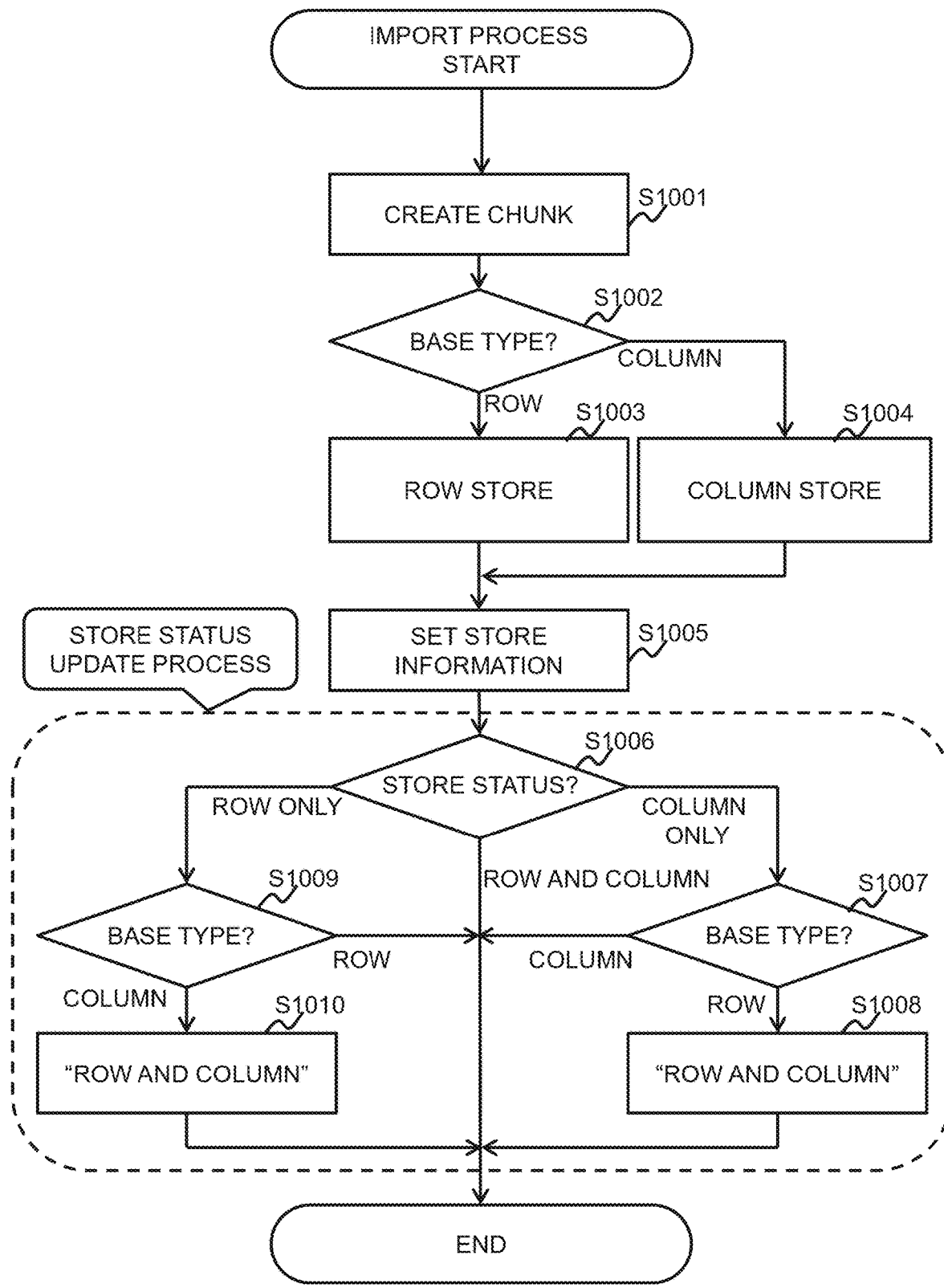
FIG. 10 shows a flow of the import process.

FIG. 10 shows a flow of the import process.

The import section 121 creates a chunk (S1001). The import section 121 determines the store format indicated by the base type 303 (S1002). In the case where the base type 303 is "ROW", the import section 121 invokes the row store processing section 125, and the row store processing section 125 stores a data body R (a data body in the row store format) in the chunk created in S1001 (S1003). On the other hand, in the case where the base type 303 is "COLUMN", the import section 121 invokes the column store processing section 126, and the column store processing section 126 stores a data body C (a data body in the column store format) in the chunk created in S1001 (S1004).

After S1003 or S1004, the import section 121 sets store information ("ROW" or "COLUMN") in the chunk (S1005).

Then, the import section 121 performs the store status update process. The specifics are as follows.

In the case where the store status 304 is "COLUMN only" (S1006: COLUMN only), if the base type 303 is "ROW" (S1007: ROW), the import section 121 updates the store status 304 from "COLUMN only" to "ROW and COLUMN" (S1008). On the other hand, if the base type 303 is "COLUMN" (S1007: COLUMN), the import process is ended.

In the case where the store status 304 is "ROW only" (S1006: ROW only), if the base type 303 is "COLUMN" (S1009: COLUMN), the import section 121 updates the store status 304 from "ROW only" to "ROW and COLUMN" (S1010). On the other hand, if the base type 303 is "ROW" (S1009: ROW), the import process is ended.

In the case where the store status 304 is "ROW and COLUMN" (S1006: ROW and COLUMN), the process is ended.

Figure 11:
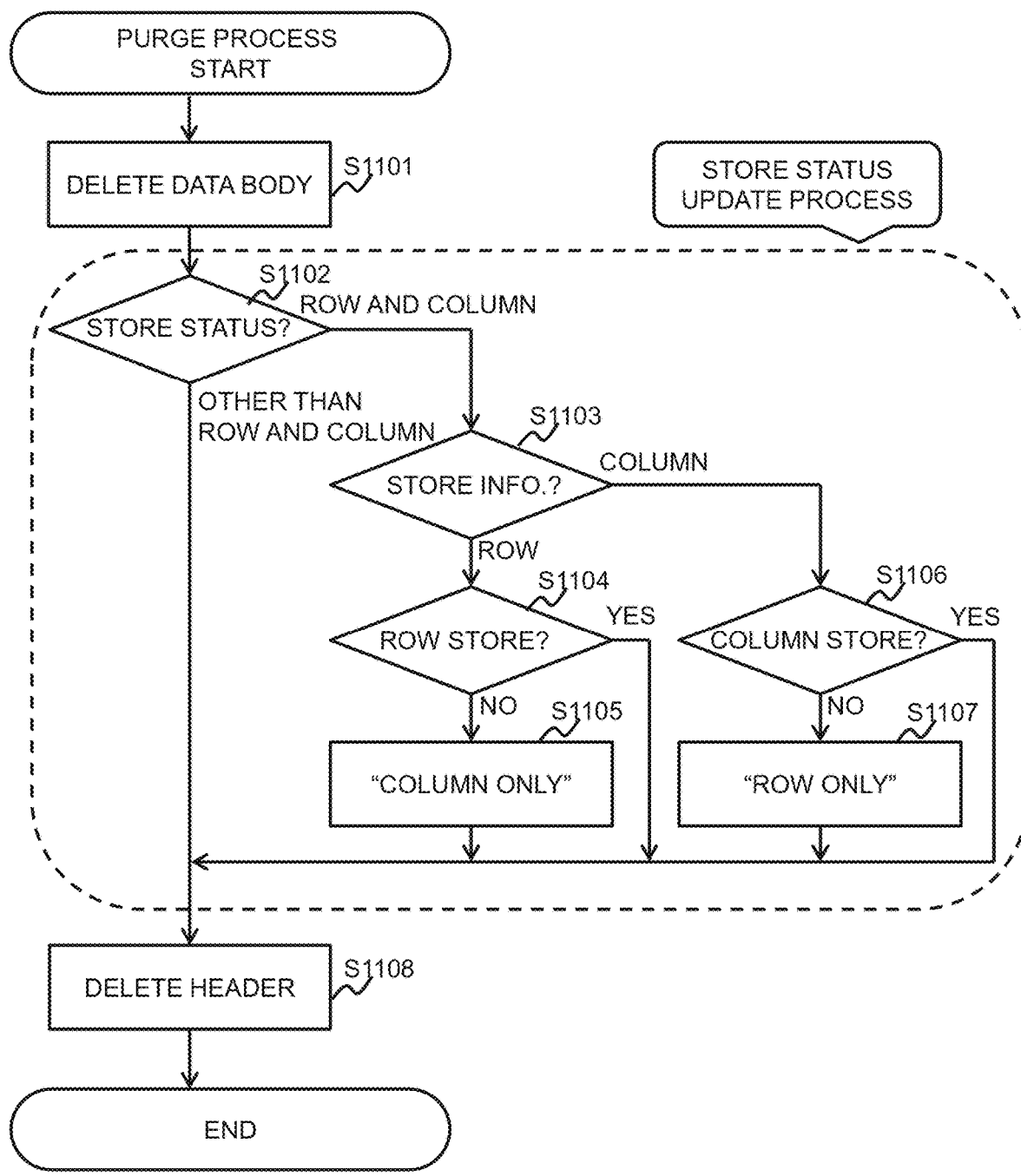
FIG. 11 shows a flow of the purge process.

FIG. 11 shows a flow of the purge process.

The exclusion section 122 deletes the data body from a purge target chunk (S1101).

Then, the exclusion section 122 performs the store status update process. The specifics are as follows.

In the case where the store status 304 is "ROW and COLUMN" (S1102: ROW and COLUMN), the exclusion section 122 determines the store information in the purge target chunk (S1103).

In the case where the store information is "ROW", if there is no chunk R in the table including the purge target chunk (S1104: NO), the exclusion section 122 updates the store status 304 to "COLUMN only" (S1105). If there is a chunk R in the table including the purge target chunk (S1104: YES), the store status update process is ended.

In the case where the store information is "COLUMN", if there is no chunk C in the table including the purge target chunk (S1106: NO), the exclusion section 122 updates the store status 304 to "ROW only" (S1107). If there is a chunk C in the table including the purge target chunk (S1106: YES), the store status update process is ended.

In the case where the store status 304 is other than "ROW and COLUMN" (S1102: other than ROW and COLUMN), the store status update process is ended.

After the store status update process is ended, the exclusion section 122 also deletes the header from the purge target chunk (S1108).

Figure 12:
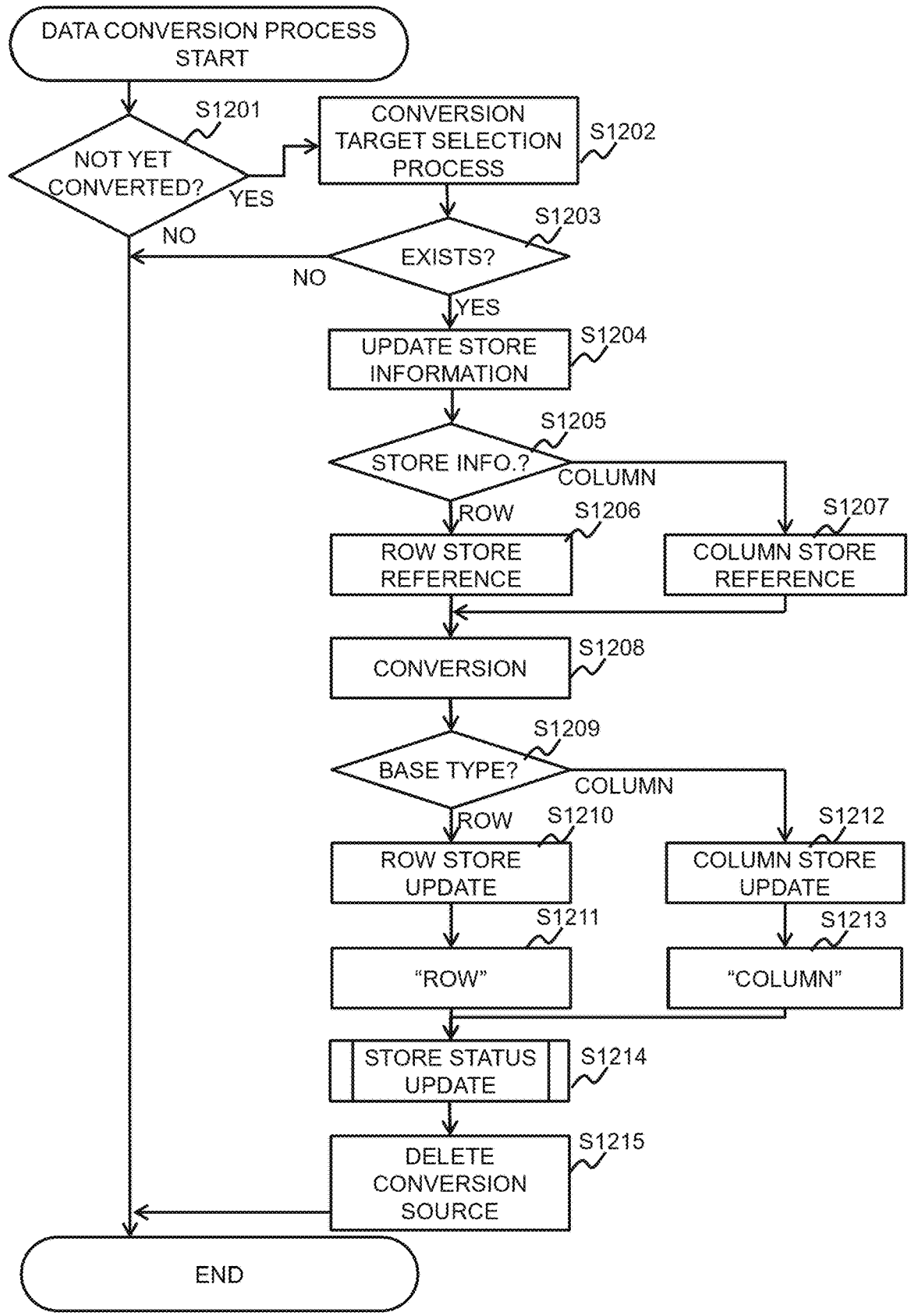
FIG. 12 shows a flow of the data conversion process.

FIG. 12 shows a flow of the data conversion process.

The data conversion section 124 determines whether there is a non-converted chunk or not, based on the base type 303 and the store status 304 corresponding to a conversion target table (S1201). In the case where there is no non-converted chunk (S1201: NO), the data conversion process is ended.

In the case where there is a non-converted chunk (S1201: YES), the data conversion section 124 determines for each of all the non-converted chunks (or a non-converted chunk specified by the second conversion request), based on the chunk management table 130, the conversion priority which is according to one or more specified priority points, and selects a non-converted chunk for which the determined conversion priority is relatively high as the conversion target (S1202). If there are only non-converted chunks for which the conversion priority is below a predetermined value (S1203: NO), the data conversion process is ended.

The data conversion section 124 updates the store information of the selected conversion target chunk to indicate that data is being converted (for example, "R→C", "C→R", or "R→R") (S1204).

In the case where the store information before update is "ROW" (S1205: ROW), the data conversion section 124 invokes the row store processing section 125, and the row store processing section 125 reads the data body R from the conversion target chunk (S1206). On the other hand, in the case where the store information before update is "COLUMN" (S1205: COLUMN), the data conversion section 124 invokes the column store processing section 126, and the column store processing section 126 reads the data body C from the conversion target chunk (S1207).

The data conversion section 124 converts the data body read in S1206 or S1207 into a data body having a data structure according to the store format indicated by the base type 303 corresponding to the conversion target table (S1208).

In the case where the base type 303 is "ROW" (S1209: ROW), the data conversion section 124 invokes the row store processing section 125, and the row store processing section 125 stores the data body R after conversion in the conversion target chunk (S1210). The data conversion section 124 also updates the store information of the conversion target chunk to "ROW" (S1211).

In the case where the base type 303 is "COLUMN" (S1209: COLUMN), the data conversion section 124 invokes the column store processing section 126, and the column store processing section 126 stores the data body C after conversion in the conversion target chunk (S1212). The data conversion section 124 also updates the store information of the conversion target chunk to "COLUMN" (S1213).

Then, the data conversion section 124 performs the store status update process (S1214). That is, the data conversion section 124 updates the store status 304 corresponding to the conversion target table to the store status after S1211 or S1213.

The data conversion section 124 deletes the data body which is the conversion source from the conversion target chunk (S1215).

Figure 13:
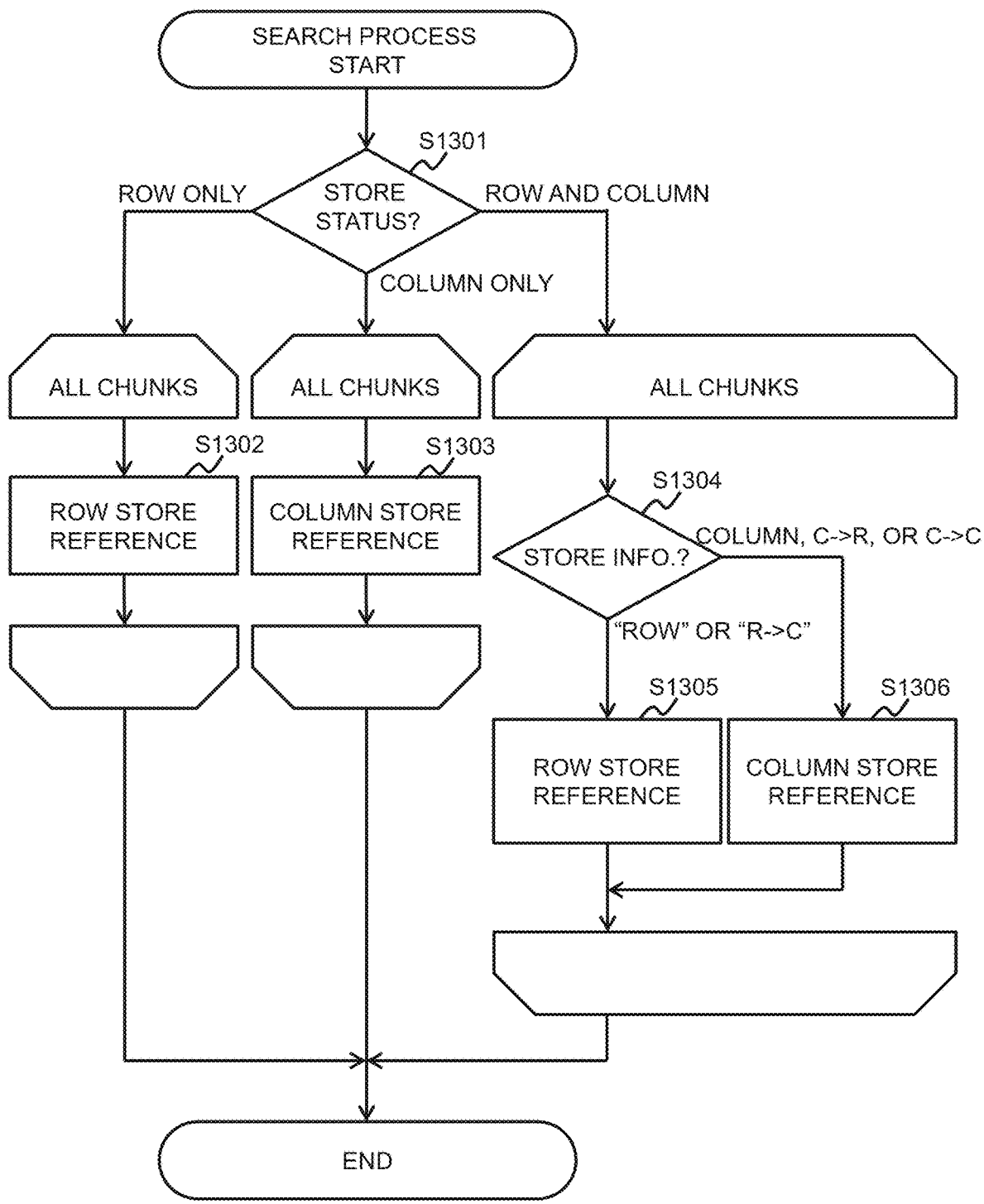
FIG. 13 shows a flow of a search process.

FIG. 13 shows a flow of the search process.

In the search process, the query execution section 120 accesses the data body in a chunk by a method according to the store status corresponding to a search target table, and the store information for each chunk in the table.

Specifically, in the case where the store status 304 is "ROW only" (S1301: ROW only), the query execution section 120 invokes the row store processing section 125 for each chunk R in the table, and the row store processing section 125 refers to the data body in the chunk R (S1302).

In the case where the store status 304 is "COLUMN only" (S1301: COLUMN only), the query execution section 120 invokes the column store processing section 126 for each chunk C in the table, and the column store processing section 126 refers to the data body in the chunk C (S1303).

In the case where the store status 304 is "ROW and COLUMN" (S1301: ROW and COLUMN), the query execution section 120 performs the following process for each chunk in the table. That is, the query execution section 120 determines the store information of the chunk (S1304). If the store status is "ROW" or "R→C", the query execution section 120 invokes the row store processing section 125, and the row store processing section 125 refers to the data body in the chunk (S1305). On the other hand, if the store status is "COLUMN", "C→R", or "C→C", the query execution section 120 invokes the column store processing section 126, and the column store processing section 126 refers to the data body in the chunk (S1306).

Figure 14:
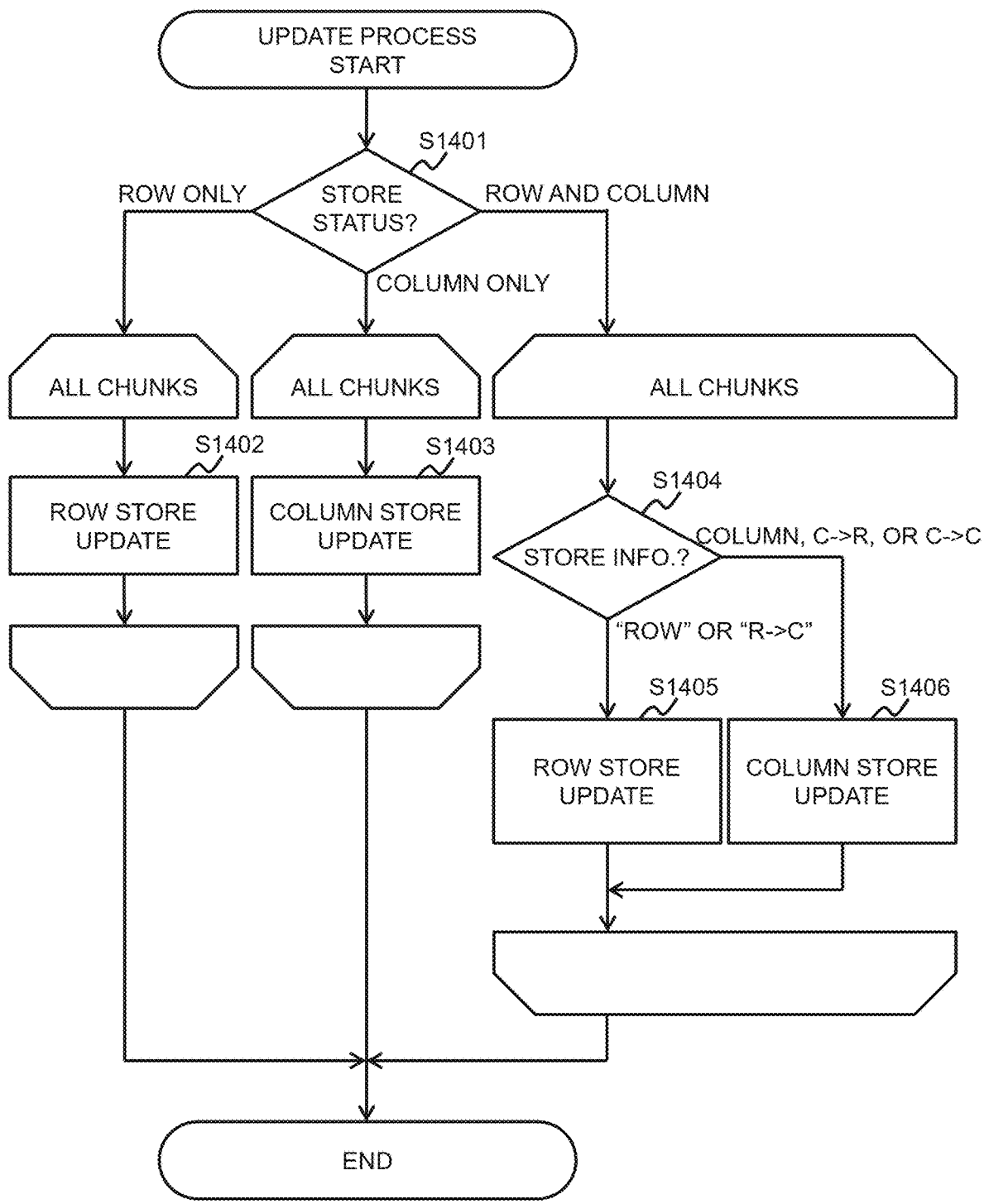
FIG. 14 shows a flow of an update process.

FIG. 14 shows a flow of the update process.

The update process is a process for updating the table 181. The flow of the update process is a flow that can be understood by reading the term "refer" in the flow of the search process as "update".

Specifically, in the case where the store status 304 is "ROW only" (S1401: ROW only), the query execution section 120 invokes the row store processing section 125 for each chunk R in the table, and the row store processing section 125 updates the data body in the chunk R (S1402).

In the case where the store status 304 is "COLUMN only" (S1401: COLUMN only), the query execution section 120 invokes the column store processing section 126 for each chunk C in the table, and the column store processing section 126 updates the data body in the chunk C (S1403).

In the case where the store status 304 is "ROW and COLUMN" (S1401: ROW and COLUMN), the query execution section 120 performs the following process for each chunk in the table. That is, the query execution section 120 determines the store information of the chunk (S1404). If the store status is "ROW" or "R→C", the query execution section 120 invokes the row store processing section 125, and the row store processing section 125 updates the data body in the chunk (S1405). On the other hand, if the store status is "COLUMN", "C→R", or "C→C", the query execution section 120 invokes the column store processing section 126, and the column store processing section 126 updates the data body in the chunk (S1406).

Second Embodiment

A description will be given of a second embodiment. Differences to the first embodiment will be mainly described, and a description of common aspects with the first embodiment will be omitted or simplified.

In the second embodiment, instead of (or in addition to) the purge process for a chunk for which the data retention period is exceeded, the exclusion section 122 performs an archiving process. The "archiving process" is an example of the exclusion process, and is a process for compressing the data body in a target chunk and storing the data body in a file, and for deleting the file from the DB area 180 (see FIG. 2). The archiving process is performed regularly (or irregularly).

The exclusion section 122 also performs an archive setting process. In the "archive setting process", an archive time period (a time period between import time and archive time) is associated with a processing target table. The archive setting process is performed in response to an archive setting request, for example. The archive setting request specifies the T-ID of the processing target table, and the archive time period.

Figure 15:
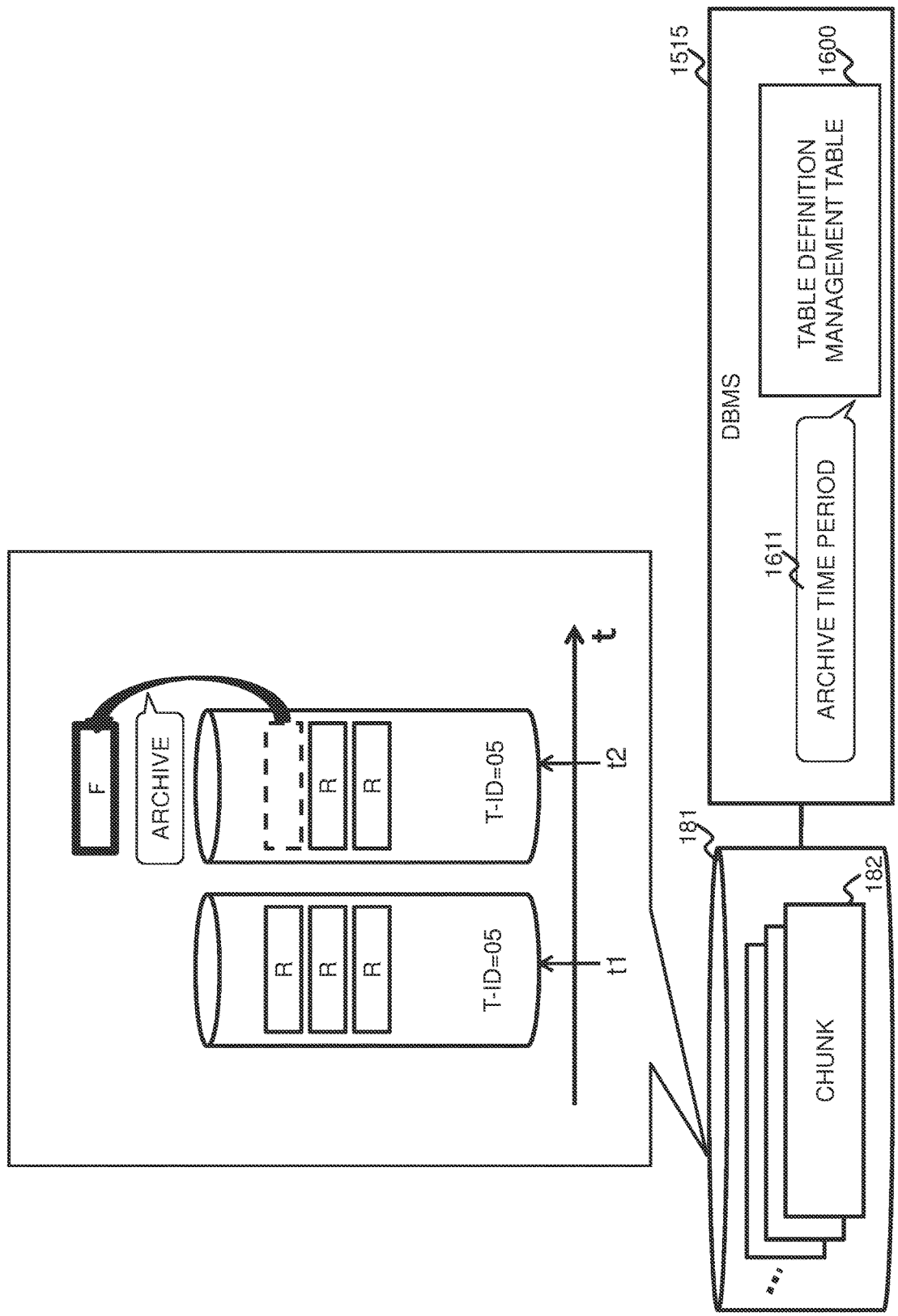
FIG. 15 shows an outline of a second embodiment.

FIG. 15 shows an outline of the second embodiment.

At a time t1, the exclusion section 122 performs the archive setting process for a table 05. An archive time period 1611 (information indicating the archive time period) is thereby set in an entry corresponding to the table 05 (an entry in a table definition management table 1600).

At a time t2, the exclusion section 122 performs the archiving process on the table 05. Specifically, if there is a chunk for which the archive time (a time which is when the archive time period for the table 05 has elapsed since the import time, and which is a scheduled time for archiving) is exceeded in the table 05, the exclusion section 122 archives the chunk. That is, the exclusion section 122 creates an archive file (F) containing compressed data of the data body of the chunk, and stores the file (F) in a storage area outside the DB area 180. In the archiving process, the exclusion section 122 deletes the archived chunk from the table 05. In the case where the store status of the table 05 is changed (to ROW only or COLUMN only, for example) due to archiving (deletion) of the chunk, the exclusion section 122 updates the table 05.

FIG. 16 shows a structure of the table definition management table 1600 according to the second embodiment.

Information indicating the archive time period (archive time period) 1611 is set in an entry corresponding to each table.

FIG. 17 shows a structure of a chunk management table 1700 according to the second embodiment.

Information (archive time) 1716 indicating the archive time which is a time when the archive time period has elapsed since the import time is set in an entry corresponding to each chunk.

FIG. 18 shows a relationship between a priority point "archive time", and conversion priority for the data conversion process for converting the row store format into the column store format.

According to this priority point, the newer the archiver time, the higher the conversion priority. This is because the newer the archive time, the longer the time until a chunk is archived from the table (the chunk exists longer), and it is considered that it is worth performing the data conversion process especially on such a chunk. In other words, the older the archive time, the shorter the period until the chunk is archived from the table, and it is considered that it is not worth performing the data conversion process on such a chunk.

Additionally, the same relationship applies with respect to the conversion priority for the data conversion process for converting the column store format into the row store format.

Third Embodiment

A description will be given of a third embodiment. Differences to the first and the second embodiments will be mainly described, and a description of common aspects with the first and the second embodiments will be omitted or simplified.

In the third embodiment, at least one of two or more store formats is related to addition of auxiliary data for a table. For example, the auxiliary data is at least one of an index and a materialized view. The process described above regarding the store format of a table can be applied to the process related to addition of the auxiliary data. That is, the auxiliary data can be efficiently added. The auxiliary data is added (generated) for each chunk.

Figure 19:
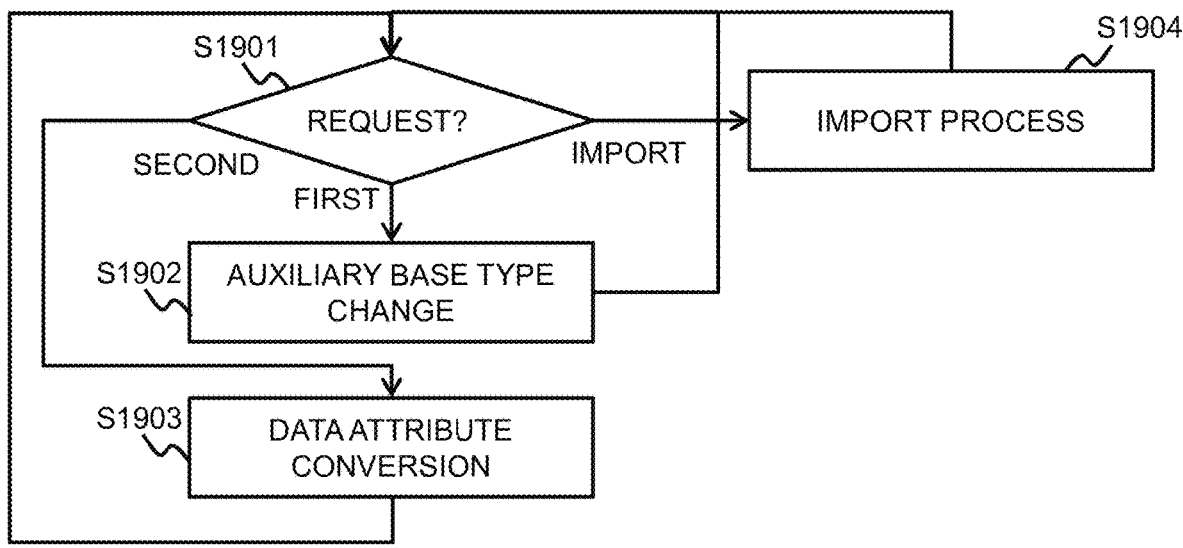
FIG. 19 shows an example flow of a process related to addition of auxiliary data.

FIG. 19 shows an example flow of a process related to addition of the auxiliary data.

In the case where a first request for addition of the auxiliary data is received (S1901: first), the base type change section 123 changes an auxiliary base type, which is information indicating an attribute related to addition of the auxiliary data, to a store format indicating that the auxiliary data is already added (process corresponding to the base type change process) (S1902).

In the case where a second request for addition of the auxiliary data is received (S1901: second), if there is a chunk with a different attribute from the attribute indicated by the auxiliary base type, the data conversion section 124 performs a data attribute conversion process for converting the chunk with the different attribute into a chunk with the attribute indicated by the auxiliary base type (process corresponding to the data conversion process) (S1903). For example, if the attribute indicated by the auxiliary base type is "added", the data conversion section 124 adds the auxiliary data to a chunk to which the auxiliary data is not added. On the other hand, if the attribute information indicated by the auxiliary base type is "non-added", the data conversion section 124 deletes the auxiliary data from a chunk to which the auxiliary data is added.

In the case where an import request is received (S1901: import), the import section 121 imports a chunk which is in the store format indicated by the base type 303 and which has an attribute indicated by the auxiliary base type (S1904).

A chunk which is selected in S1903 as an execution target may be a chunk for which the conversion priority according to the above mentioned one or more priority points is relatively high. In the case where the auxiliary data base type indicates that the auxiliary data is already added, the relationship between the priority point and the conversion priority is as follows, for example.

With respect to (P1), the shorter the data retention period, the higher the conversion priority. This is because a chunk is to remain long in the table.

With respect to (P2) and (P3), the newer the reference time or the update time, or the higher the reference frequency or the update frequency, the higher the conversion priority. This is because the auxiliary data is mainly used to access a table, and is data contributing to speeding up access.

With respect to (P4), the higher the access cost, the higher the conversion priority. This is because speeding up of processing can be expected due to presence of the auxiliary data.

With respect to (P5), the conversion priority is high in the case of the non-power-saving state. This is because a corresponding chunk is stored in the hardware device (PDEV) in the activation state, and is considered highly likely to be referred to.

With respect to (P6), the newer the archive time, the higher the conversion priority. This is because a chunk is to remain long in the table.

Fourth Embodiment

A description will be given of a fourth embodiment. Differences to the first to the third embodiments will be mainly described, and a description of common aspects with the first to the third embodiments will be omitted or simplified.

Figure 20:
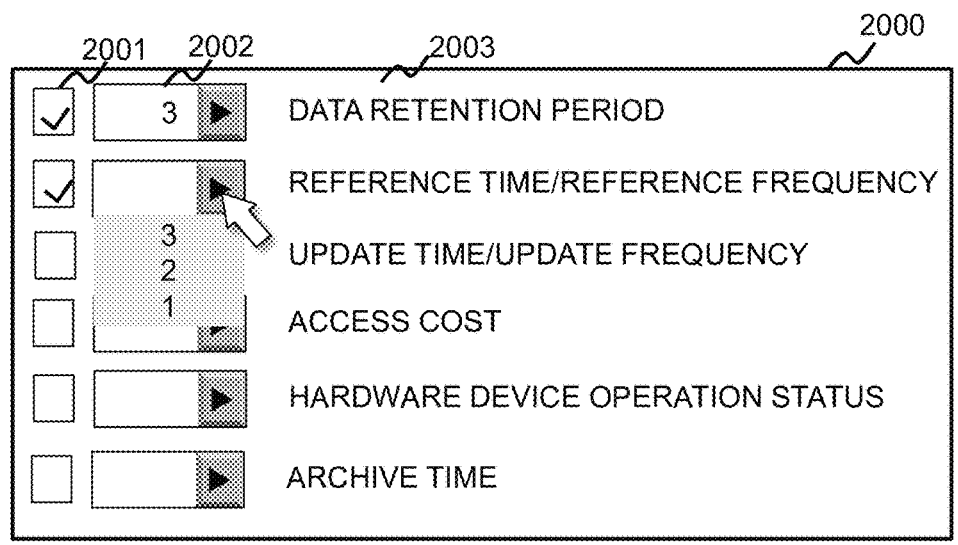
FIG. 20 shows an example of a priority point specification user interface (UI).

FIG. 20 shows an example of a priority point specification user interface (UI).

A priority point specification UI 2000 is a UI used by a user to input a priority point (or its importance). The priority point specification UI 2000 includes, for each priority point that can be specified by a user, a selection UI 2001, an importance specification UI 2002, and a priority point text 2003.

The selection UI 2001 is a UI (for example, a check box) for inputting whether or not to adopt the priority point. The importance specification UI 2002 is a UI for inputting importance (for example, one of three stages 3, 2, 1, where "3" is the highest and "1" is the lowest) to be associated with the priority point. The priority point text 2003 is a text indicating the contents of the priority point.

Reception of specification of a priority point (and importance) through the priority point specification UI 2000, and setting of the specified priority point (and importance) are performed by the data conversion section 124.

With respect to each non-converted chunk, the conversion priority of the non-converted chunk is determined based on one or more priority points and at least one importance of the one or more priority points. For example, even if the conversion priority is high according to a certain priority point, if the conversion priority is low according to a priority point with higher importance than the aforementioned priority point, the conversion priority is low.

Heretofore, several embodiments have been described, but these are merely examples for describing the present invention, and are not intended to limit the scope of the present invention to the embodiments. The present invention can be implemented in other various modes.

For example, the DBMS 115 (data conversion section 124) may limit the value of X in such a way that the time required for the data conversion process on X conversion target chunks becomes shorter than an execution cycle of the import process, or may select conversion target chunks in such a way that a total of the data amount (access cost described later) of X conversion target chunks becomes equal to or smaller than a predetermined value.

For example, the data conversion process is an example of first data processing on a certain piece of data. The import process is an example of second data processing on the certain piece of data, which cannot be performed during the first data processing. A processing time of the first data processing on all of the certain piece of data is typically longer than an execution interval of the second data processing. The first data processing may be data processing (for example, a data conversion process) aimed at other than reduction in power consumption, instead of being a data conversion process for reducing power consumption. Accordingly, the following expressions can be given, based on the description given above. According to Expression 1, the first data processing can be performed while frequently performing the second data processing. According to Expression 2, in the case where there are two or more data portions which may be taken as the target of the first data processing, the first data processing can be performed efficiently on the data portions.

<Expression 1>

A data processing system (for example, a computer system) including:

a state change section (for example, a base type change section) for changing, in response to a request for first data processing on a certain piece of data, a data state of the certain piece of data to a state in which the first data processing is already performed on the certain piece of data;

a first data processing section (for example, a data conversion section) for performing, asynchronously with execution of the changing of state, the first data processing on a data portion (unit of second data processing), of the certain piece of data, in a different state from the data state, and a second data processing section (for example, an import section) for regularly or irregularly performing second data processing according to the data state on the certain piece of data, in a case where the first data processing is not performed.

<Expression 2>

The data processing system according to Expression 1, wherein the first data processing section performs the first data processing preferentially on a data portion, in the certain piece of data, for which processing priority according to one or more priority points is relatively high.

What is claimed is:

1. A database management system comprising:
at least one processor, which when executing at least one program, configures the at least one processor to:
perform, in response to a conversion request that is a request to convert a store format of a table in a database, a base type change process that is a process for changing the store format indicated by a base type that is information indicating the store format of the table into a store format according to the conversion request;
perform, asynchronously with the base type change process performed in response to the conversion request, a data conversion process that is a process for converting a non-converted chunk that is a chunk in a store format different from the store format indicated by the base type, among all chunks in the table, into a chunk in the store format indicated by the base type, each chunk being an import unit of data into the table;
regularly or irregularly perform an import process that is a process for importing a chunk in the store format indicated by the base type into the table, the import process not being executable during the data conversion process; and
perform a search process on the table,
wherein a store status is associated with the table,
wherein the store status indicates whether chunks in the table are only chunks in a certain store format, or a mixture of chunks in different store formats,
wherein, in a case of newly adding, to the table, a chunk in the store format indicated by the base type corresponding to the table, the at least one processor updates the store status as necessary,
wherein the store status is changed as necessary in the data conversion process on any non-converted chunk in the table, and
wherein the at least one processor is further configured to:
specify, in a case where the store status indicates that chunks in the table are a mixture of chunks in different store formats, store information that is information indicating, for each chunk, a store format of the chunk and whether data conversion is being performed on the chunk, and refers to the chunk according to the store information that is specified, and refer, in a case where the store status indicates that chunks in the table are only chunks in the certain store format, to each chunk according to the certain store format that is specified, without specifying the store information of the chunk, for each chunk.

2. The database management system according to claim 1, wherein the at least one processor is configured to perform the data conversion process in units of X conversion target chunks (X is a natural number), and the X conversion target chunks are chunks selected from the all non-converted chunks as targets of the data conversion process, and are chunks, among the all non-converted chunks, for which conversion priority according to one or more priority points is relatively high.

3. The database management system according to claim 2, wherein the one or more priority points for each chunk are one or more priority points among priority points (P1) to (P6) described below:

(P1) a data retention period that is elapsed time from a time of import of the chunk;

(P2) a reference time that is a time of last reference to the chunk, or a reference frequency that is a frequency of reference to the chunk;

(P3) an update time that is a time of last update of the chunk, or an update frequency that is a frequency of update of the chunk;

(P4) an access cost that takes a larger value as a data amount of the chunk is increased;

(P5) whether a storage device storing the chunk is in a power-saving state or not; and (P6) an archive time that is a scheduled time of archiving the chunk.

4. The database management system according to claim 3, wherein in a case where the base type before change indicates a row store format, the base type after change indicates a column store format, and accordingly, each non-converted chunk is a chunk in the row store format, a relationship between the priority point and the conversion priority is as follows:

with respect to (P1), the shorter the data retention period, the higher the conversion priority;

with respect to (P2), the newer the reference time, or the higher the reference frequency, the higher the conversion priority;

with respect to (P3), the older the update time, or the lower the update frequency, the higher the conversion priority;

with respect to (P4), the higher the access cost, the higher the conversion priority;

with respect to (P5), the conversion priority is high in a case of a non-power-saving state; and with respect to (P6), the newer the archive time, the higher the conversion priority.

5. The database management system according to claim 3, wherein in a case where the base type before change indicates a column store format, the base type after change indicates a row store format, and accordingly, each non-converted chunk is a chunk in the column store format, a relationship between the priority point and the conversion priority is as follows:

with respect to (P1), the shorter the data retention period, the higher the conversion priority;

with respect to (P2), the older the reference time, or the lower the reference frequency, the higher the conversion priority;

with respect to (P3), the newer the update time, or the higher the update frequency, the higher the conversion priority;

with respect to (P4), the higher the access cost, the higher the conversion priority;

with respect to (P5), the conversion priority is high in a case of a non-power-saving state; and with respect to (P6), the newer the archive time, the higher the conversion priority.

6. The database management system according to claim 2, wherein the at least one processor avoids selecting, as at least one of the X conversion target chunks, a non-converted chunk for which the conversion priority is below a predetermined priority.

7. The database management system according to claim 2, wherein with respect to each non-converted chunk, the conversion priority for the non-converted chunk is determined based on the one or more priority points and at least one importance of the one or more priority points.

8. The database management system according to claim 2, wherein the at least one processor is further configured to perform the data conversion process in response to a second conversion request different from a first conversion request that is the conversion request, and the second conversion request specifies (a) and (b) described below:

(a) the one or more priority points adopted from one or a plurality of priority points; and (b) one of a value of the X, and a list of IDs of at least one conversion target chunk.

9. The database management system according to claim 1, wherein the at least one processor is further configured to perform an exclusion process for excluding the chunk from the table, for each chunk in the table for which a specific period of time is elapsed from an import time of the chunk.

10. The database management system according to claim 9, wherein the exclusion process is at least one of a purge process for purging a chunk from the table, and an archiving process for excluding a chunk from the table as an archive file.

11. The database management system according to claim 1, wherein some store formats of two or more store formats are an addition of auxiliary data related to the table.

12. The database management system according to claim 10, wherein the auxiliary data is at least one of an index and a materialized view.

13. The database management system according to claim 11, wherein in a case where a store format after change indicates addition of the auxiliary data, wherein the at least one processor is further configured to:

change an auxiliary base type that is information indicating an attribute related to addition of the auxiliary data to an attribute indicating that the auxiliary data is already added; and convert a chunk having an attribute different from the attribute indicated by the auxiliary base type into a chunk having the attribute indicated by the auxiliary base type.

14. A database management method comprising:

performing an import process that is a process for importing, into a table in a database, a chunk in a store format indicated by a base type that is information indicating a store format of the table, the import process not being executable during a data conversion process, the data conversion process being a process for converting a non-converted chunk that is a chunk in a store format different from the store format indicated by the base type, among all chunks in the table, into a chunk in the store format indicated by the base type, each chunk being an import unit of data into the table;

performing, in response to a conversion request that is a request to convert the store format of the table, a base type change process for changing the store format indicated by the base type that is information indicating the store format of the table into a store format according to the conversion request;

performing the data conversion process asynchronously with the base type change process that is performed in response to the conversion request;

importing into the table, in the import process after execution of the base type change process, a chunk in a store format indicated by the base type after change; and performing a search process on the table, wherein a store status is associated with the table, wherein the store status indicates whether chunks in the table are only chunks in a certain store format, or a mixture of chunks in different store formats, wherein, in a case of newly adding, to the table, a chunk in the store format indicated by the base type corresponding to the table, the at least one processor updates the store status as necessary, wherein the store status is changed as necessary in the data conversion process on any non-converted chunk in the table, and wherein the method further comprises:

specifying, in a case where the store status indicates that chunks in the table are a mixture of chunks in different store formats, store information that is information indicating, for each chunk, a store format of the chunk and whether data conversion is being performed on the chunk, and refers to the chunk according to the store information that is specified; and referring, in a case where the store status indicates that chunks in the table are only chunks in the certain store format, to each chunk according to the certain store format that is specified, without specifying the store information of the chunk, for each chunk.

* * * * *